United States Patent
Yu et al.

(10) Patent No.: US 11,917,329 B2
(45) Date of Patent: Feb. 27, 2024

(54) DISPLAY DEVICE AND VIDEO COMMUNICATION DATA PROCESSING METHOD

(71) Applicant: Hisense Visual Technology Co., Ltd., Qingdao (CN)

(72) Inventors: Yanmei Yu, Qingdao (CN); Luming Yang, Qingdao (CN); Zhiqiang Li, Qingdao (CN)

(73) Assignee: HISENSE VISUAL TECHNOLOGY CO., LTD., Shandong (CN)

(*) Notice: Subject to any disclaimer, the term of this patent is extended or adjusted under 35 U.S.C. 154(b) by 356 days.

(21) Appl. No.: 17/332,713

(22) Filed: May 27, 2021

(65) Prior Publication Data

US 2021/0289165 A1 Sep. 16, 2021

Related U.S. Application Data

(63) Continuation of application No. PCT/CN2020/084717, filed on Apr. 14, 2020.

(30) Foreign Application Priority Data

Jun. 10, 2019 (CN) .......................... 201910496921.4

(51) Int. Cl.
*H04N 7/14* (2006.01)
*G06T 3/40* (2006.01)
(Continued)

(52) U.S. Cl.
CPC ................. *H04N 7/14* (2013.01); *G06T 3/40* (2013.01); *G06T 7/20* (2013.01); *G06T 7/50* (2017.01);
(Continued)

(58) Field of Classification Search
CPC .... H04N 7/14; G06T 7/70; G06T 3/40; G06T 7/20
See application file for complete search history.

(56) References Cited

U.S. PATENT DOCUMENTS 8,174,556 B1 * 5/2012 Barraclough .......... H04N 7/142
348/14.08
2014/0055552 A1 2/2014 Song et al.

FOREIGN PATENT DOCUMENTS

| CN | 102025965 A | 4/2011 |
| CN | 105787884 A | 7/2016 |

(Continued)

OTHER PUBLICATIONS

International Search Report completed Jul. 2, 2020 for International Application No. PCT/CN2020/084717.

*Primary Examiner* — Olisa Anwah
(74) *Attorney, Agent, or Firm* — Workman Nydegger

(57) ABSTRACT

A display device and a video communication data processing method are disclosed. The method comprises: in response to an instruction for video communication with at least one peer device, a controller collecting a global image of a local device by means of an image acquisition device; and presenting a local preview window in a user interface, and displaying, in the local preview window, a video image of the local device according to the global image, wherein when there is a moving target in the global image, the video image of the local device is a partial image corresponding to a target stable area of the moving target.

16 Claims, 14 Drawing Sheets

(51) Int. Cl.
*G06T 7/20* (2017.01)
*G06T 7/50* (2017.01)
*G06T 7/70* (2017.01)

(52) U.S. Cl.
CPC ...... *G06T 7/70* (2017.01); *G06T 2207/10016* (2013.01); *G06T 2207/30242* (2013.01)

(56) References Cited

FOREIGN PATENT DOCUMENTS

| | | |
|---|---|---|
| CN | 105979194 A | 9/2016 |
| CN | 106792092 A | 5/2017 |
| CN | 107317993 A | 11/2017 |
| CN | 107396165 A | 11/2017 |

* cited by examiner

DISPLAY DEVICE AND VIDEO COMMUNICATION DATA PROCESSING METHOD

CROSS REFERENCE

The application is a continuation application of International Application No. PCT/CN2020/084717, filed on Apr. 14, 2020, which claims priority to Chinese patent application No. 201910496921.4, filed on Jun. 10, 2019, all of which are hereby incorporated by reference in their entireties.

TECHNICAL FIELD

The disclosure relates to the technical field of a display device, in particular to a display device, a video communication data processing method, a video communication method and a display method.

BACKGROUND

Currently, since the display device such as a smart TV can provide a user with a play image for an audio, a video and a picture, etc., the display device has received extensive attention from users.

With the development of big data and artificial intelligence, the user' demands for the functions of the display device is increasing day by day. For example, a user wants to play display pictures and to present a multi-channel video chat picture at the same time; or, when the user is in a game scene, the real image of the participant is displayed in real time; or, while learning content from a current picture in an educational application, the user can interact with parents/teachers in real-time with remote audio and video, and the like.

Therefore, there is an urgent need to provide a display device capable of achieving the above functions.

SUMMARY

The disclosure provides a display device, a video communication data processing method, a video communication method and a display method to solve the problems.

In the first aspect, the disclosure provides a display device, including:
a display, configured to present a user interface;
an image collector, configured to collect a global image of a local device; and
a controller, configured to:
collect a global image of the local device through the image collector in response to an instruction for video communication with at least one peer device;
present a local preview window in the user interface, and display a video image of the local device in the local preview window according to the global image, wherein when a moving target exists in the global image, the video image of the local device is a partial image corresponding to a target stable area of the moving target; and
generate video data of the local device according to the video image of the local device displayed in the local preview window and send the video data to the peer device, in response to establishment of video communication connection with the peer device.

In the second aspect, the disclosure further provides a display device, including:
a display, configured to present a user interface; and
a controller, configured to:
receive peer video data sent by a peer display device in response to establishment of video communication connection with a peer device;
present a peer display window in the user interface; and
display a peer video image in the peer display window according to the peer video data, wherein when a moving target exists in the peer video image, the peer video image is a picture corresponding to a target stable area of the moving target.

In the third aspect, the disclosure further provides a display device, including:
a display, configured to present a user interface;
an image collector, configured to collect a global image of a local device; and
a controller, configured to:
obtain the global image, collected by the image collector, of the local device in response to starting of the image collector; and
present a local preview window in the user interface, and display a video image of the local device in the local preview window according to the global image of the local device, wherein when a moving target exists in the global image, the video image of the local device is a partial image corresponding to a target stable area of the moving target.

In the fourth aspect, the disclosure further provides a video communication data processing method applied to a display device, wherein the method includes:
collecting a global image of a scene where a moving target is located through an image collector in response to an instruction for video communication with at least one peer device;
obtaining the global image;
detecting a moving target in the global image, and determining a target stable area containing the moving target;
processing the global image according to the target stable area to obtain a partial image; and
performing video communication with the peer device using the partial image.

In the fifth aspect, the disclosure further provides a video communication method, wherein the method includes:
receiving, by a first display device, peer video data sent by a second display device in response to establishment of video communication connection with the second display device;
presenting a peer display window in a user interface; and
displaying a peer video image in the peer display window according to the peer video data, wherein when a moving target exists in the peer video image, the peer video image is a picture corresponding to a target stable area of the moving target.

In the sixth aspect, the disclosure further provides a display method applied to a display device, wherein the display device is provided with an image collector, and the method includes:
obtaining a global image, collected by the image collector, of a local device in response to starting of the image collector; and
presenting a local preview window in the user interface, and displaying a video image of the local device in the local preview window according to the global image of the local device, wherein when a moving target exists in the global image, the video image of the local device is a partial image corresponding to a target stable area of the moving target.

BRIEF DESCRIPTION OF THE DRAWINGS

In order to clearly describe the technical solution of the disclosure, the accompanying drawings needed in the embodiments of the disclosure will be briefly described. It will be apparent that other accompanying drawings can be obtained based on these accompanying drawings without paying creative work.

DETAILED DESCRIPTION OF THE EMBODIMENTS

In order to make the purpose, the technical solution and the advantages of exemplary embodiments of the present disclosure clearer, the technical solutions of the exemplary embodiments of the present disclosure will be described clearly and completely below in connection with the accompanying drawings in the exemplary embodiments of the present disclosure. It will be apparent that the described exemplary embodiments are only some but not all embodiments of the present disclosure.

In order to cause ordinary skilled in the art to well understand the technical solution in the present disclosure, the technical solution in the embodiments of the present disclosure will be described clearly and completely below in connection with the accompanying drawings in the embodiments of the present disclosure. It will be apparent that the described embodiments are only some but not all embodiments of the present disclosure. Based on the embodiments in the present disclosure, all other embodiments obtained by those of ordinary skilled in the art without making inventive effort shall fall within the scope of protection of the present disclosure.

Figure 3:
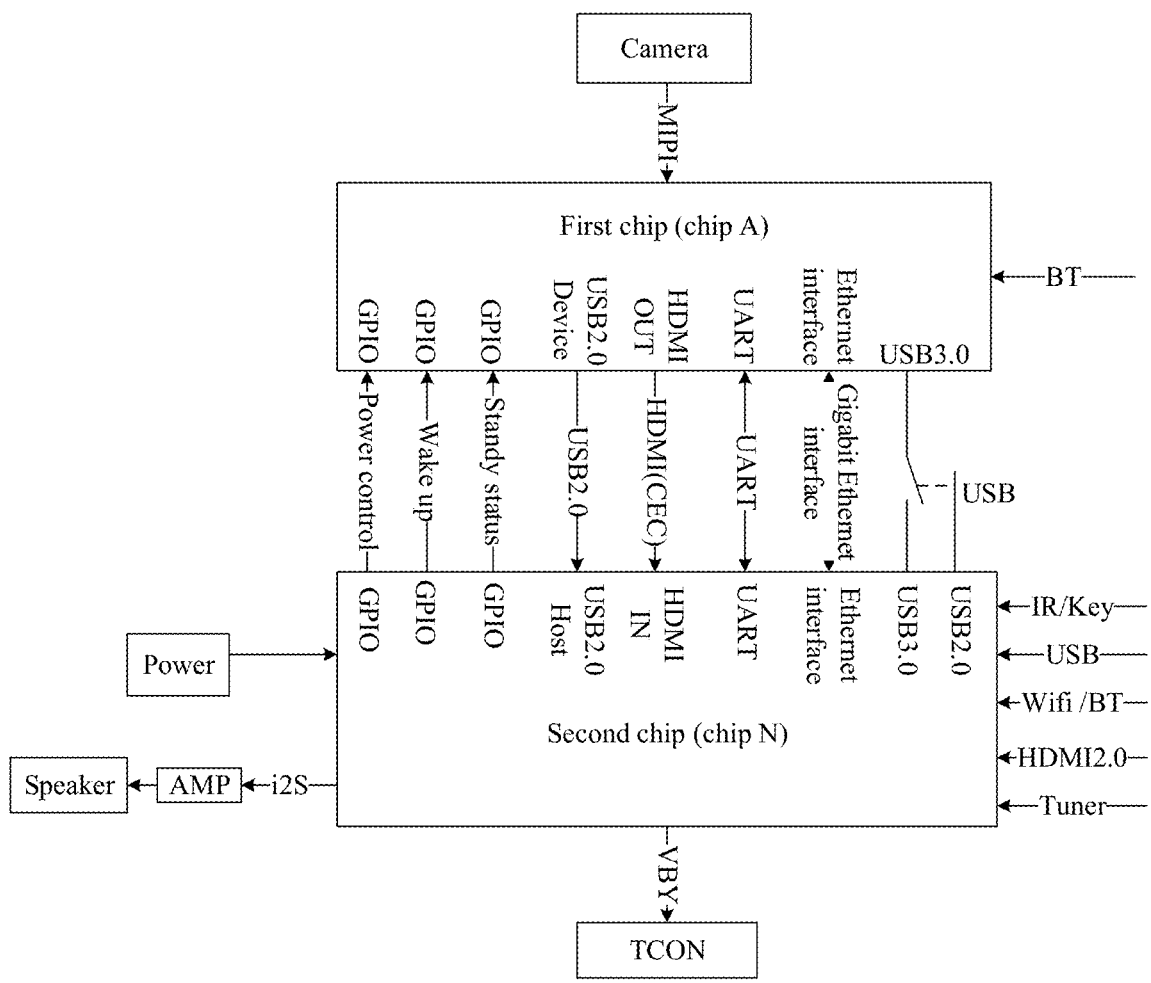
FIG. 3 schematically shows a block diagram of a hardware configuration of a display device 200.
Figure 4:
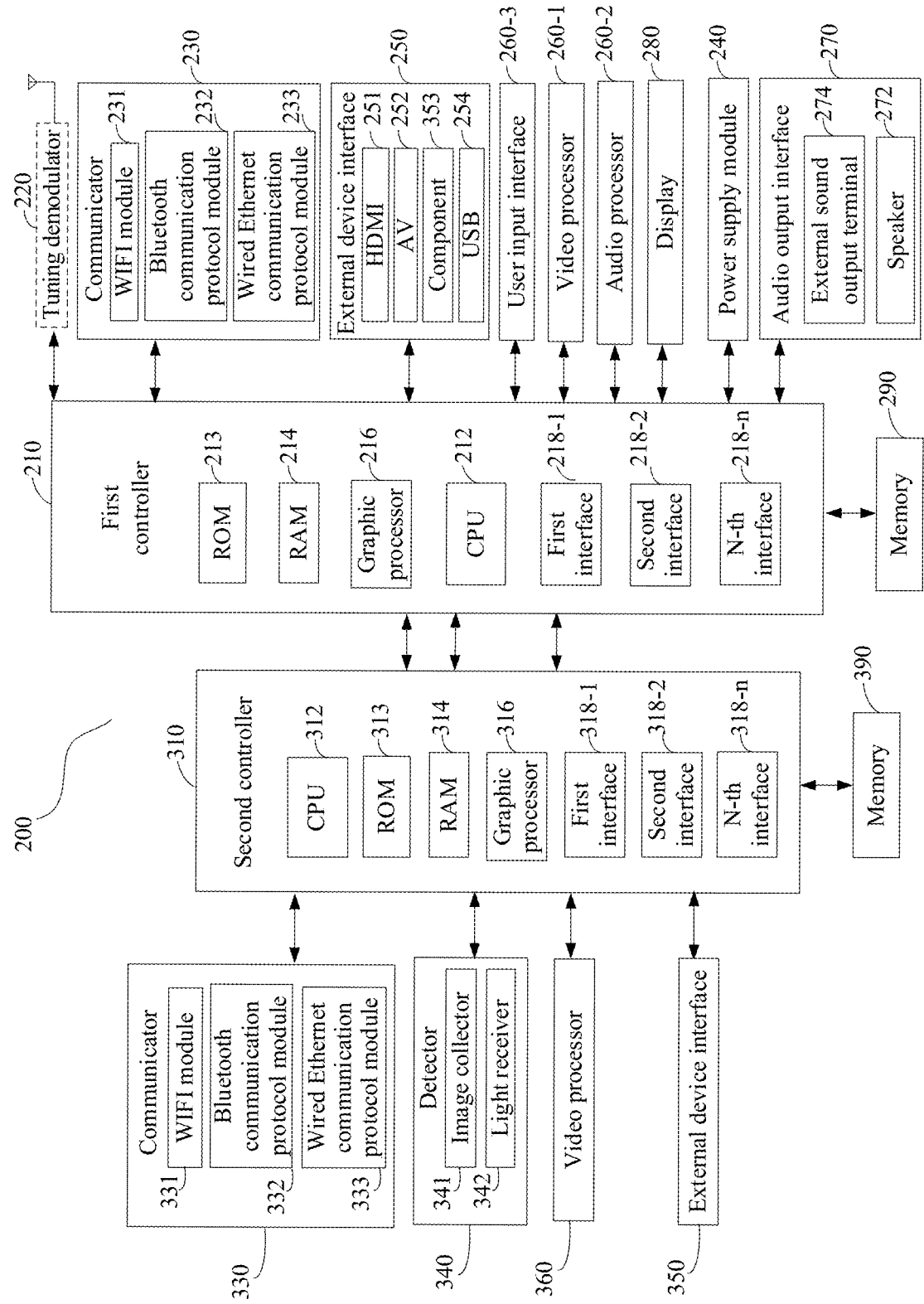
FIG. 4 schematically shows a block diagram of a hardware structure of the display device 200 according to FIG. 3.
Figure 5:
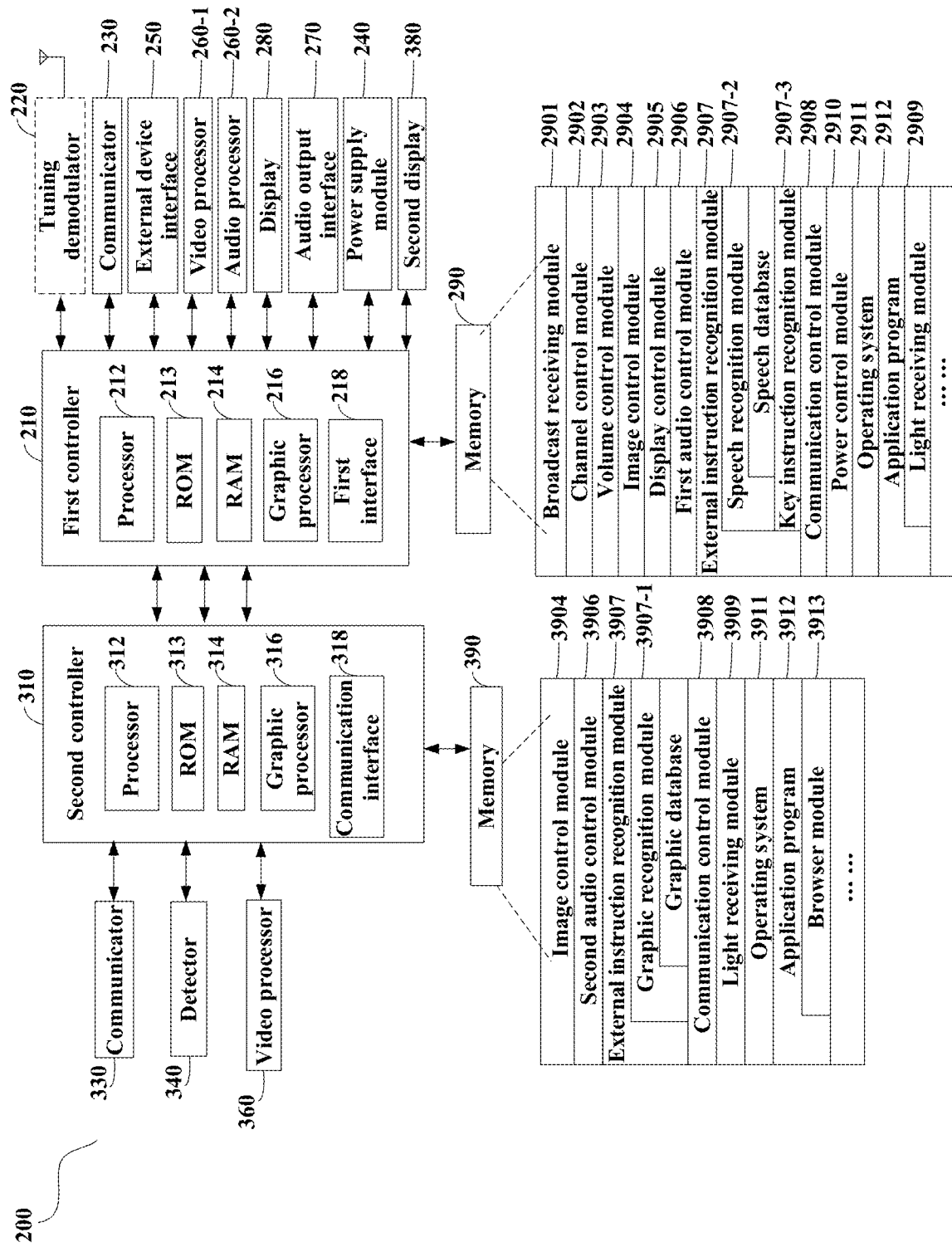
FIG. 5 schematically shows a schematic diagram of a functional configuration of the display device 200.

A display device according to the present disclosure can be a display device with multiple chip architectures, such as a display device with a dual-chip (dual hardware system) architecture shown in FIGS. 3-5 of the present disclosure, or a display device with a non-dual-chip architecture, which is not limited in the present disclosure.

For convenience of users, various external device interfaces are usually arranged in the display device, so that the different peripheral devices or cables can be connected to realize corresponding functions. When a high-definition camera is connected to an interface of the display device, if a hardware system of the display device does not have a hardware interface of a high-pixel camera receiving source codes, data received by the camera cannot be presented on a display screen of the display device.

Terms in the present disclosure are described below with reference to the accompanying drawings first. It is noted that the following description of various terms is merely to provide an easier understanding of the present disclosure, and does not intend to limit the scope of protection of the present disclosure.

A term "module" used in various embodiments of the present disclosure refers to any known or later developed hardware, software, firmware, artificial intelligence, fuzzy logic or combination of hardware and/or software codes, which is capable of executing functions related to the element.

A term "remote controller" used in various embodiments of the present disclosure refers to a component of an electronic device (such as the display device disclosed in the present disclosure), and the component can generally and wirelessly control the electronic device within a short distance. Generally, the component may be connected with the electronic device by using infrared and/or radio frequency (RF) signals and/or Bluetooth, and may also include functional modules such as WiFi, wireless USB, Bluetooth, and motion sensors. For example, in a hand-held touch remote controller, a user interface in a touch screen is used for replacing most of physical built-in hard keys in a general remote control apparatus.

A term "gesture" used in various embodiments of the present disclosure refers to user actions that the user expresses expected ideas, actions, purposes and/or results through a change of hand shape or hand movement.

A term "hardware system" used in various embodiments of the present disclosure refers to a physical component consisting of mechanical, optical, electrical and magnetic devices such as integrated circuits (IC) and printed circuit boards (PCB), which has the functions of calculation, control, storage, input and output. In the embodiments of the present disclosure, the hardware system is also commonly referred to as a motherboard or a chip.

Figure 1:
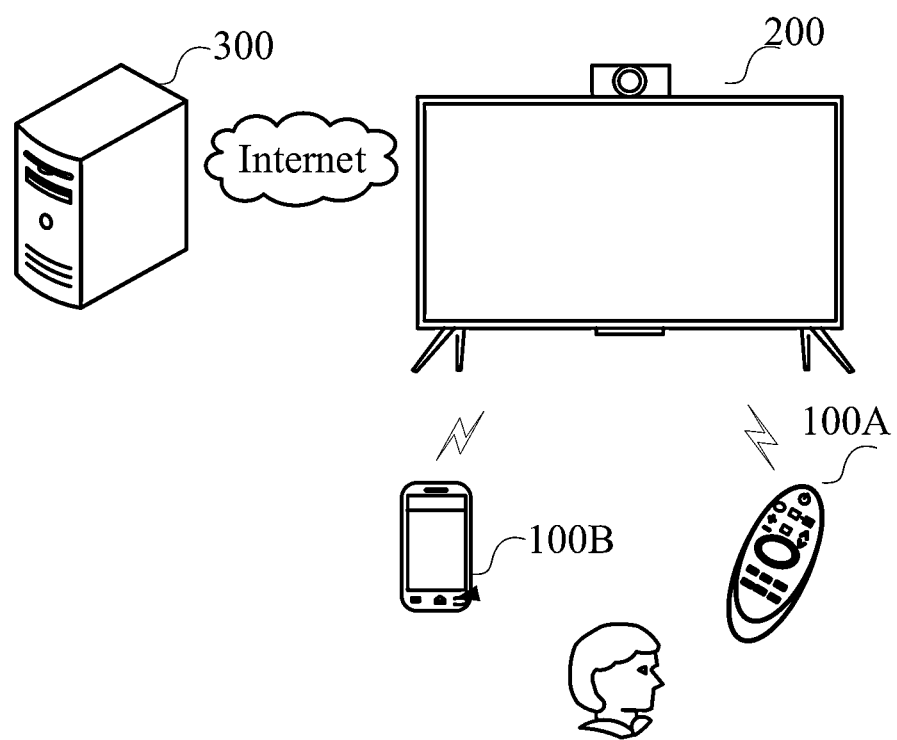
FIG. 1 schematically shows a schematic diagram of an operation scene between a display device and a control apparatus.

FIG. 1 schematically illustrates a schematic diagram of an operation scene between a display device and a control apparatus according to an embodiment. As shown in FIG. 1, the user can operate the display device 200 through the control apparatus 100.

The control apparatus 100 may be a remote controller 100A, which can communicate with the display device 200 through an infrared protocol communication mode, a Bluetooth protocol communication mode, a ZigBee protocol communication mode or other short-distance communication modes, for controlling the display device 200 by wireless or other wired modes. The user can control the display device 200 by inputting user instructions through keys on the remote controller, voice input, control panel input, and the like. For example, the user can input corresponding control instructions through volume up and volume down keys, channel control keys, up/down/left/right directional keys, voice input keys, menu keys, power keys, and the like on the remote controller to realize the function of controlling the display device 200.

The control apparatus 100 may also be a smart device, such as a mobile terminal 100B, a tablet computer, a computer, a laptop computer, and the like, which can communicate with the display device 200 through a local area network (LAN), a wide area network (WAN), a wireless local area network (WLAN) or other networks, and realize the control of the display device 200 through an application corresponding to the display device 200. For example, the display device 200 is controlled by the application running on the smart device. The application can provide users with various controls through an intuitive user interface (UI) on the screen associated with the smart device.

"User interface" is a medium interface for interaction and information exchange between an application or an operating system and a user, which realizes conversion between the internal form of information and a form acceptable to the users. Graphic user interface (GUI) is a common form of the user interface, and refers to a user interface displayed graphically and related to computer operation. The graphic user interface may be an icon, a window, a control and other interface elements displayed on the display screen of the electronic device, wherein the control may include visual interface elements such as an icon, a button, a menu, a tab, a text box, a dialog box, a status bar, a navigation bar and Widget.

Exemplarily, both a mobile terminal 100B and the display device 200 can install software applications, so that connection and communication between the mobile terminal 100B and the display device 200 can be realized through a network communication protocol, thereby achieving the purpose of one-to-one control operation and data communication. For example, the control instruction protocol may be established between the mobile terminal 100B and the display device 200, and a remote control keyboard may be synchronized to the mobile terminal 100B. By controlling the user interface on the mobile terminal 100B, the function of controlling the display device 200 is realized. The audio and video content displayed on the mobile terminal 100B may also be transmitted to the display device 200 to realize the synchronous display function.

As shown in FIG. 1, the display device 200 can also communicate with a server 300 through various communication modes. In various embodiments of the present disclosure, the display device 200 can be allowed to communicate with the server 300 via a local area network, a wireless local area network or other networks. The server 300 can provide various content and interactions for the display device 200.

Exemplarily, the display device 200 receives software updates or accesses a remotely stored digital media library by sending and receiving information and interacting with an electronic program guide (EPG). The server 300 can be one group of servers and multiple groups of servers, or can be one or more types of servers. Other network service content such as video on demand (VOD) and advertisement service is provided through the server 300.

The display device 200 may be a liquid crystal display, an OLED (Organic Light Emitting Diode) display, a projection display device and a smart TV. The type, size, resolution and the like of the specific display device are not limited, and it will be understood by those skilled in the art that the display device 200 can be subject to some variation in performance and configuration as required.

The display device 200 can provide not only broadcasting and receiving TV functions, but also a smart network TV function that provides functions that a computer can support. Examples include network TV, smart TV, internet protocol TV (IPTV), and the like.

As shown in FIG. 1, the display device connects with a camera or has a camera, used for presenting images captured by the camera on the display interface of the display device or other display devices, so that interactive chat between users can be realized. Specifically, the images captured by the camera can be displayed in a full screen, a half screen or any optional area in the display device.

As an alternative connection mode, the camera is connected with a rear housing of a display through a connecting plate, and is fixedly mounted at the middle of the upper side of the rear housing of the display. As a mountable mode, the camera may be fixedly mounted at any position of the rear housing of the display as long as it is ensured that an image capture area is not blocked by the rear housing. For example, the image capture area has the same display orientation as the display device.

As another alternative connection mode, the camera may connect with the rear housing of the display through the connecting plate or other conceivable connectors which allows the camera to go up and go down, and a motor is mounted on the connector. When a user wants to use the camera or an application needs to use the camera, the camera rises from the display, and when the camera is not needed, the camera can be embedded into the rear housing, so as to protect the camera from being damaged.

As an embodiment, the camera used in the present disclosure may be 16 megapixels to achieve the purpose of ultra-high definition display. In actual use, cameras with pixels higher or lower than 16 megapixels may also be used.

When the camera is mounted in the display device, content displayed in different application scenes of the display device can be fused in many different ways, so as to achieve functions which cannot be achieved by traditional display devices.

Exemplarily, the user can have a video chat with at least one of other users while watching a video program. The presentation of the video program may be used as a background image, and the window of video chat is displayed on the background image. Visually, the function can be referred to as "chatting while watching".

In some implementations, in the scene of "chatting while watching", while watching live video or online video, the user can perform at least one-channel video chat across terminals.

In other embodiments, the user can have video chat with at least one of other users while learning in an educational application. For example, students can interact with teachers remotely while learning the content in educational applications. Visually, the function can be referred to as "chatting while learning".

In other embodiments, when playing a card game, the user has a video chat with players entering the game. For example, the players can realize remote interaction with other players when entering the game application for participating in the game. Visually, the function can be referred to as "playing while watching".

In some implementations, the game scene is fused with the video image, and a portrait in the video image is cut out and displayed in the game image to improve the user experience.

In some implementations, in motion sensing games (such as playing balls, boxing, running and dancing), human body postures and actions, limb detection and tracking, and key point data detection of human bones are acquired through the camera, and then fused with cartoons in the game to realize games in scenes such as sports and dancing.

In other embodiments, the user can interact with at least one of other users in video and voice in a karaoke application. Visually, the function can be referred to as "singing while watching". Preferably, when at least one user enters the application in the chat scene, multiple users can record one song together.

In other embodiments, the user can turn on the camera locally to obtain images and videos, which can be referred to as "looking in the mirror".

In other examples, more functions may be added or reduced. The functions of the display device are not particularly limited in the present disclosure.

Figure 2:
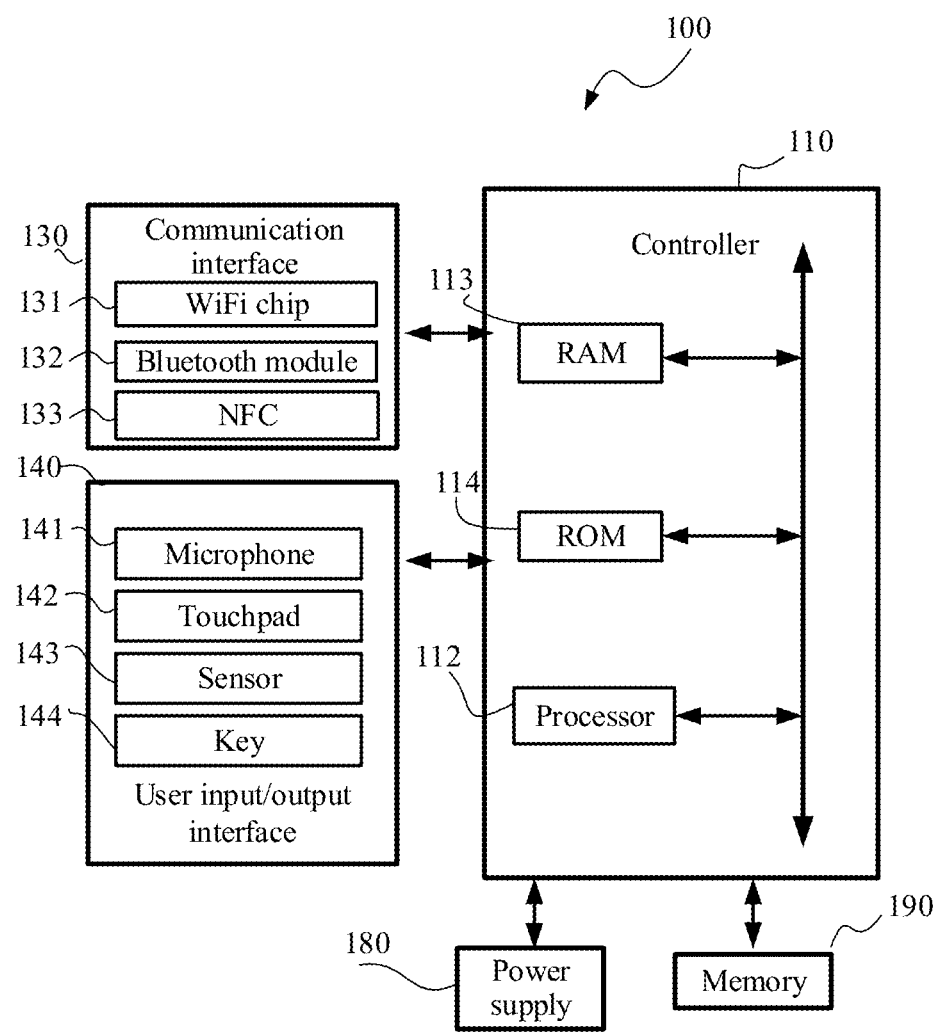
FIG. 2 schematically shows a block diagram of a hardware configuration of a control apparatus 100.

FIG. 2 exemplarily shows a configuration block diagram of the control apparatus 100 according to an exemplary embodiment. As shown in FIG. 2, the control apparatus 100 includes a controller 110, a communicator 130, a user input/output interface 140, a memory 190 and a power supply module 180.

The control apparatus 100 is configured to control the display device 200, receive input operation instructions from a user, and convert the operation instructions into instructions that the display device 200 can recognize and respond to, thereby playing an interactive intermediary role between the user and the display device 200. For example, the display device 200 responds to channel up and channel down operation by operating the channel up and channel down keys on the control apparatus 100.

In some embodiments, the control apparatus 100 may be a smart device. For example, the control apparatus 100 can be installed with various applications for controlling the display device 200 according to user requirements.

In some embodiments, as shown in FIG. 1, a mobile terminal 100B or other smart electronic devices can play a similar function as the control apparatus 100 after being installed with the application for controlling the display device 200. For example, by the application installed by the user, various function keys or virtual buttons on a graphic user interface that can be provided on the mobile terminal 100B or other smart electronic devices to realize the function of physical keys on the control apparatus 100.

The controller 110 includes a processor 112, an RAM 113, an ROM 114, a communication interface and a communication bus. The controller 110 is used to control the running and operation of the control apparatus 100, as well as communication and cooperation among internal components, and external and internal data processing functions.

Under the control of the controller 110, communications of control signals and data signals between the communicator 130 and the display device 200 are realized. For example, the received user input signals are sent to the display device 200. The communicator 130 may include at least one of a WIFI module 131, a Bluetooth module 132, an NFC module 133, and other communication modules.

For the user input/output interface 140, the input interface includes at least one of input interfaces such as a microphone 141, a touchpad 142, a sensor 143, and a key 144. For example, the user instruction input function may be realized through voice, touch, gestures, press and other actions of the user, and the input interface converts received analog signals into digital signals and converts the digital signals into corresponding instruction signals and sends the instruction signals to the display device 200.

The output interface includes an interface for transmitting the received user instructions to the display device 200. In some embodiments, the output interface may be an infrared interface or a radio frequency interface. For example, when the output interface is an infrared signal interface, it is necessary to convert user input instructions into infrared control signals according to an infrared control protocol and send the infrared control signals to the display device 200 through an infrared transmission module. When the output interface is a radio frequency signal interface, it is necessary to convert the user input instructions into digital signals, then modulate the digital signals according to a radio frequency control signal modulation protocol, and then send the modulated digital signals to the display device 200 through a radio frequency transmission terminal.

In some embodiments, the control apparatus 100 includes at least one of the communicator 130 and the output interface. The communicator 130, such as WIFI, Bluetooth, NFC and other modules, is provided in the control apparatus 100, and the user input instructions can be sent to the display device 200 according to a WIFI protocol, a Bluetooth protocol or an NFC protocol.

The memory 190 is used to store various running programs, data and applications for driving and controlling the control apparatus 100 under the control of the controller 110. The memory 190 can store various control signal instructions input from the user.

The power supply module 180 is configured to provide running power support for various elements of the control apparatus 100 under the control of the controller 110, and may include a battery and related control circuits.

In some embodiments, as shown in FIGS. 3-5, a block diagram of a hardware configuration of a hardware system in the display device 200 with dual chips is given.

When dual hardware system architecture is adopted, the structure relationship of the hardware system can be shown in FIG. 3. For convenience of description, one hardware system in the dual hardware system architecture is referred to as a first hardware system or a system A or a chip A, and the other hardware system is referred to as a second hardware system or a system N or a chip N. The chip A includes a controller and various interfaces in the chip A, and the chip N includes a controller and various interfaces in the chip N. Independent operating systems can be installed in the chip A and the chip N, so that two independent but interrelated subsystems exist in the display device 200.

In some embodiments, the chip A may also be referred to as a first chip or a first controller, and the chip N may also be referred to as a second chip or a second controller.

As shown in FIG. 3, the chip A and the chip N may be connected with, communicate with and be powered by a plurality of different types of interfaces. The types of the interfaces between the chip A and the chip N may include general-purpose input/output (GPIO), a USB interface, an HDMI interface, a UART interface, and the like. One or more of the interfaces can be used for communications or power transmission between the chip A and the chip N. For example, as shown in FIG. 3, under the dual hardware system architecture, the chip N may be powered by an external power, while the chip A may be powered by the chip N instead of the external power.

In addition to the interface connected with the chip N, the chip A may also include an interface for connecting with other devices or components, such as an MIPI interface for connecting with the camera and the Bluetooth interface as shown in FIG. 3.

Similarly, in addition to the interface connected with the chip N, the chip N may also include a VBY interface for connecting with a display screen TCON (Timer Control Register), and an i2S interface for connecting with a power amplifier (AMP) and a speaker, and an IR/Key interface, an USB interface, a Wifi interface, a Bluetooth interface, a HDMI interface, a Tuner interface, and the like.

The dual-chip architecture will be further explained with reference to FIG. 4. It should be noted that FIG. 4 is only for exemplary description of the dual hardware system architecture of the present disclosure, and is not meant to limit the present disclosure. In practical applications, both hardware systems can contain more or less hardware or interfaces as required.

FIG. 4 exemplarily shows a block diagram of a hardware architecture of the display device 200 according to FIG. 3. As shown in FIG. 4, the hardware system of the display device 200 may include the chip A and the chip N, and modules connected with the chip A or the chip N through various interfaces.

The chip N may include a tuning demodulator 220, a communicator 230, an external device interface 250, a controller 210, a memory 290, a user input interface, a video processor 260-1, an audio processor 260-2, a display 280, an audio output interface 270, and a power supply module. In other embodiments, the chip N may also include more or fewer modules.

The tuning demodulator 220 is used for performing modulation and demodulation processing such as amplification, frequency mixing and resonance, on broadcasting TV signals received by wired or wireless means, so as to demodulate audio and video signals and additional information (such as EPG data signals) carried in the frequency of TV channels selected by the user from a plurality of wireless or wired broadcasting TV signals. According to the different broadcasting systems of the TV signals, there are many signal pathways for the tuning demodulator 220, such as terrestrial broadcasting, wired broadcasting, satellite broadcasting or internet broadcasting. According to different modulation types, the signals may be processed via digital modulation or analog modulation. The tuning demodulator 220 can demodulate analog signals and/or digital signals according to different kinds of received TV signals.

The tuning demodulator 220 is also used to respond to a frequency of a TV channel selected by the user and the TV signals carried by the frequency according to the user selection and under the control of the controller 210.

In other exemplary embodiments, the tuning demodulator 220 may also be in an external device, such as an external set top box. In this way, the set top box outputs TV audio and video signals after modulation and demodulation, and inputs the signals into the display device 200 through an external device interface 250.

A communicator 230 is a component for communicating with the external device or an external server according to various communication protocol types. For example: the communicator 230 may include a WIFI module 231, a Bluetooth communication protocol module 232, a wired Ethernet communication protocol module 233, an infrared communication protocol module, and other network communication protocol modules or near field communication protocol modules.

The display device 200 can establish connection of control signals and data signals with external control devices or content providing devices via the communicator 230. For example, the communicator can receive control signals from the remote controller 100A under the control of the controller.

The external device interface 250 is a component that provides data transmission between a chip N controller 210 and the chip A as well as other external devices. The external device interface may be connected with the external devices such as the set top box, a game apparatus and a laptop computer in a wired/wireless manner, and can receive data such as video signals (e.g., moving images), audio signals (e.g., music) and additional information (e.g., EPG) from the external devices.

The external device interface 250 may include any one or more of a high definition multimedia interface (HDMI) terminal 251, a composite video blanking and synchronization (CVBS) terminal 252, an analog or digital component terminal 253, a universal serial bus (USB) terminal 254, and a red, green and blue (RGB) terminal (not shown in the figure). The present application does not limit the number and the types of the external device interfaces.

The controller 210 controls the operation of the display device 200 and responds to the user operation by running various software control programs (such as the operating system and/or various applications) stored in the memory 290.

As shown in FIG. 4, the controller 210 includes a read-only memory RAM 214, a random access memory ROM 213, a graphic processor 216, a CPU 212, a communication interface 218, and a communication bus. The RAM 214, the ROM 213, the graphic processor 216, the CPU 212 and the communication interface 218 are connected through the bus.

The ROM 213 is used for storing various system starting instructions. For example, when receiving a power-on signal, a power supply of the display device 200 is started, and the CPU 212 runs the system starting instructions in the ROM, and copies the operating system stored in the memory 290 to the RAM 214 to start running and starting the operating system. After the operating system is started, the CPU 212 copies various applications in the memory 290 to the RAM 214, and then starts running and starting various applications.

The graphic processor 216 is used to generate various graphic objects, such as icons, operation menus and user input instruction display graphics. An operator is included in the graphic processor 216 to operate by receiving various interaction instructions input from the user and display various objects according to display attributes. A renderer is also included in the graphic processor 216, various objects obtained on the basis of the operator are generated, and rendering results are displayed on the display 280.

The CPU 212 is used for running the operating system and the application instructions, stored in the memory 290, and executing various applications, data and content according to various interaction instructions received from outside, so as to finally display and play various audio and video content.

In some exemplary embodiments, the CPU 212 may include a plurality of processors. The plurality of processors may include one main processor and a plurality of or one sub-processor. The main processor is used for executing some operations of the display device 200 in a pre-power-up mode and/or displaying images in the normal mode. The plurality of or one sub-processor is used for executing one operation in a standby mode or the like.

The communication interface may include a first interface 218-1 to n-th interface 218-n. The interfaces may be network interfaces connected to external devices via a network.

The controller 210 can control the overall operation of the display device 200. For example: in response to receiving a user command for selecting a UI object displayed on the display 280, the controller 210 can execute an operation related to the object selected by the user command.

The object may be any one of selectable objects, such as a hyperlink or an icon. The operation related to the selected object can be, for example, operations for displaying link to hyperlink pages, documents, images, and the like, or operations for executing programs corresponding to an icon. The user command for selecting the UI object may be an input command through various input apparatuses (e. g., a mouse, a keyboard and a touchpad) connected to the display device 200 or a voice command corresponding to a voice spoken by the user.

The memory 290 includes various software modules for driving and controlling the display device 200. For example, various software modules stored in the memory 290 include a base module, a detection module, a communication module, a display control module, a browser module, various service modules and the like.

The base module is a bottom software module used for signal communication among various hardware in the display device 200 and sending processing and control signals to an upper module. The detection module is a management module for collecting various information from various sensors or user input interfaces, and performing digital-to-analog conversion and analysis management.

For example, a speech recognition module includes a speech analysis module and a speech instruction database module. The display control module is a module for controlling the display 280 to display image content, and can be used to play multimedia image content, UI interfaces and other information. The communication module is a module for control and data communication with the external device. The browser module is a module for executing data communication between browsing servers. The service module is a module for providing various services and various applications.

Besides, the memory 290 is also used to store the received external data and user data, images of various items in various user interfaces, visual effect images of focus objects, and the like.

The user input interface is used for sending an input signal from the user to the controller 210, or transmitting a signal output from the controller to the user. For example, the control apparatus (for example, a mobile terminal or a remote controller) can send the input signal such as a power on signal, a channel selection signal and a volume adjustment signal input from the user to the user input interface, and then the user input interface forwards the input signal to the controller; or, the control apparatus can receive the output signal such as audio, video or data output from the user input interface after being processed by the controller, and display the received output signal or output the received output signal in an audio or vibration form.

In some embodiments, the user can input the user command through a graphic user interface (GUI) displayed on the display 280, and then the user input interface receives the user input command through the graphic user interface (GUI). Or, the user can input the user command by inputting a specific sound or gesture, and the user input interface recognizes the sound or the gesture through the sensor to receive the user input command.

The video processor 260-1 is used for receiving video signals, and performing video data processing such as decompression, decoding, scaling, noise reduction, frame rate conversion, resolution conversion and image synthesis according to a standard encoding and decoding protocol of the input signals, so as to obtain video signals to be directly displayed or played on the display 280.

Exemplarily, the video processor 260-1 includes a demultiplexing module, a video decoding module, an image synthesis module, a frame rate conversion module, a display formatting module, and the like.

The demultiplexing module is used for demultiplexing an input audio and video data stream. If MPEG-2 signal is input, the demultiplexing module demultiplexes the input audio and video data stream into video signals, audio signals, and the like.

The video decoding module is used for processing the demultiplexed video signals, including decoding, scaling processing and the like.

The image synthesis module, such as an image synthesizer, is used for superimposing and mixing the GUI signals input from the user or generated by a graphic generator, with scaled video images, so as to generate an image signal for display.

The frame rate conversion module is used for converting the frame rate of input video, such as converting the input frame rates of 24 Hz, 25 Hz, 30 Hz and 60 Hz videos into 60 Hz, 120 Hz or 240 Hz frame rates, wherein the input frame rates may be related to a source video stream and the output frame rates may be related to the update rate of the display. An input format is usually realized by means of frame interpolation.

The display formatting module is used for changing the signal output by the frame rate conversion module into a signal conforming to the display format of the display, such as converting the format of the signal output by the frame rate conversion module to output RGB data signals.

The display 280 is used for receiving the image signals input from the video processor 260-1, and displaying the video content, images and menu operation interfaces. The display 280 includes a display component for image presenting and a driving component for driving image display. The displayed video content may come from the video in the broadcast signals received by the tuning demodulator 220, or from the video content input from the communicator or the external device interface. The display 220 is used for simultaneously displaying a user operation interface UI generated in the display device 200 and used for controlling the display device 200.

Depending on the different types of the displays 280, a driving component for driving the display is also included. Or, if the display 280 is a projection display, a projection apparatus and a projection screen may also be included.

The audio processor 260-2 is used for receiving audio signals, and performing audio data processing such as decompressing and decoding, noise reduction, digital-to-analog conversion and amplification according to a standard encoding and decoding protocol of the input signals to obtain the audio signals that can be played in a speaker 272.

The audio output interface 270 is used for receiving an audio signal output from the audio processor 260-2 under the control of the controller 210, and the audio output interface may include a speaker 272, or an external sound output terminal 274 output to a generating apparatus, such as an external sound terminal and an earphone output terminal, of an external device.

In other exemplary embodiments, the video processor 260-1 may include one or more chips. The audio processor 260-2 may also include one or more chips.

In some other exemplary embodiments, the video processor 260-1 and the audio processor 260-2 may be independent chips, or may be integrated with the controller 210 in one or more chips.

The power supply module is used for providing power supply support for the display device 200 by the power input from the external power supply under the control of the controller 210. The power supply module may include a built-in power supply circuit installed inside the display device 200, or may be a power supply installed outside the display device 200, for example, a power supply interface used to connect the external power supply is provided in the display device 200.

Similar to the chip N, as shown in FIG. 4, the chip A may include a controller 310, a communicator 330, a detector 340 and a memory 390. In some embodiments, a user input interface, a video processor, an audio processor, a display and an audio output interface may also be included. In some embodiments, a power supply module which independently supplies power to the chip A may also be included.

The communicator 330 is a component for communicating with the external device or an external server according to various communication protocols. For example: the communicator 330 may include a WIFI module 331, a Bluetooth communication protocol module 332, a wired Ethernet communication protocol module 333, an infrared communication protocol module, and other network communication protocol modules or near field communication protocol modules.

The communicator 330 in the chip A and the communicator 230 in the chip N also interact with each other. For example, the WiFi module 231 in the chip N is used to connect with an external network and generate network communication with an external server. The WiFi module 331 in the chip A is used to connect to the WiFi module 231 in the chip A, and is not directly connected with the external network. Therefore, for the user, the display device as shown in the embodiment displays a WiFi account to the outside.

The detector 340 is a component for collecting signals from the external environment or interacting with the outside, in the chip A of the display device. The detector 340 may include a light receiver 342, which is a sensor for collecting the intensity of ambient light and can adapt to the change of display parameters and the like by collecting ambient light, and an image collector 341 (alternatively referred to as an image or video acquisition device), such as a video camera, which can be used for collecting external environment scenes, collecting user attributes or interacting gestures from the users, and can adapt to the change of display parameters, and recognize user gestures to realize the function of interacting with the users.

The external device interface 350 is a component that provides data transmission between a controller 310 and the chip N or other external devices. The external device interface may be connected with the external devices such as the set top box, a game apparatus and a laptop computer in a wired/wireless manner.

The controller 310 controls the operation of the display device 200 and responds to the user operation by running various software control programs (for example, using installed third-party applications, and the like) stored in the memory 390 and interacting with the chip N.

As shown in FIG. 4, the controller 310 includes a read-only memory ROM 313, a random access memory RAM 314, a graphic processor 316, a CPU 312, a communication interface 318 and a communication bus. The ROM 313, the RAM 314, the graphic processor 316, the CPU 312 and the communication interface 318 are connected through the bus.

The ROM 313 is used for storing various system starting instructions. The CPU 312 runs the system starting instructions in the ROM, and copies the operating system stored in the memory 390 to the RAM 314 to start running and starting the operating system. After the operating system is started, the CPU 312 copies various applications in the memory 390 to the RAM 314, and then starts running and starting various applications.

The CPU processor 312 is used for running the operating system and the application instructions, stored in the memory 390, is used for transmitting and interacting of communication, signals, data, instructions and the like with the chip N, and is used for executing various applications, data and content according to various interaction instructions received from outside, so as to finally display and play various audio and video content.

The communication interface may include a first interface 318-1 to nth interface 318-n. The interfaces may be network interfaces connected to external devices via a network, and may also network interfaces connected to the chip N via a network.

The controller 310 can control the overall operation of the display device 200. For example: in response to receiving a user command for selecting a UI object displayed on the display 280, the controller 210 can execute an operation related to the object selected by the user command.

The graphic processor 316 is used to generate various graphic objects, such as icons, operation menus and user input instruction display graphics. An operator is included to operate by receiving various interaction instructions input from the user and display various objects according to display attributes. A renderer is also included, various objects obtained on the basis of the operator are generated, and rendering results are displayed on the display 280.

The graphic processor 316 in the chip A and the graphic processor 216 of the chip N can each generate various graphic objects. Differentially, if an application 1 is installed on the chip A and an application 2 is installed on the chip N. When the user is in the interface of the application 1 and performs the instruction input from the user in the application 1, the graphic processor 316 in the chip A generates a graphic object. When the user is in the interface of an application 2 and performs the instruction input from the user in the application 2, the graphic processor 216 in the chip N generates the graphic object.

FIG. 5 is a schematic diagram of a functional configuration of a display device exemplarily shown according to some embodiments of the present disclosure.

As shown in FIG. 5, the memory 390 in the chip A and the memory 290 in the chip A are used to store the operating system, applications, content, user data and the like, and under the control of the controller 310 in the chip A and the controller 210 in the chip N, drive the system running in the display device 200 and respond to various operations from the user. The memory 390 in the chip A and the memory 290 in the chip N may include volatile and/or nonvolatile memories.

For the chip N, the memory 290 is specifically used to store the running program driving the controller 210 in the display device 200, as well as various applications built in the display device 200, various applications downloaded by users from the external device, various graphic user interfaces related to the applications, various objects related to the graphic user interfaces, user data information, and various internal data supporting the applications. The memory 290 is used to store system software such as operating system (OS) kernels, middleware, and applications, and store input video and audio data, and other user data.

The memory 290 is specifically used to store driver programs such as the video processor 260-1, the audio processor 260-2, the display 280, the communication interface 230, the tuning demodulator 220 and the input/output interface, and related data.

In some embodiments, the memory 290 is configured to store software and/or programs, and the software programs used to represent the operating system (OS) include, for example, the kernels, the middleware, an application interface (API), and/or applications. Exemplarily, the kernel can control or manage system resources or functions implemented by other programs (such as the middleware, the API or application), and the kernels can provide an interface to allow the middleware and the API or the application to access the controller so as to control or manage system resources.

Exemplarily, the memory 290 includes a broadcast receiving module 2901, a channel control module 2902, a volume control module 2903, an image control module 2904, a display control module 2905, an audio control module 2906, an external instruction recognition module 2907, a communication control module 2908, a power control module 2910, an operating system 2911, other applications 2912, an interface layout management module 2913, an event transmission system 2914, a browser module, and the like. By running various software programs in the memory 290, the controller 210 executes various functions, such as a broadcasting TV signal reception and demodulation function, a TV channel selection control function, a volume selection control function, an image control function, a display control function, an audio control function, an external instruction recognition function, a communication control function, an optical signal reception function, a power control function, software operation platforms supporting various functions and a browser function. The memory 390 includes various software modules for driving and controlling the display device 200. For example, various software modules stored in the memory 390 include a base module, a detection module, a communication module, a display control module, a browser module, various service modules and the like. Since the functions of the memory 390 are similar to those of the memory 290, the relevant features for the memory 390 can refer to the memory 290, and will not be described in detail here.

For example, the memory 390 includes an image control module 3904, an audio control module 2906, an external instruction recognition module 3907, a communication control module 3908, a light receiving module 3909, an operating system 3911, other applications 3912, a browser module, and the like. By running various software programs in the memory 290, the controller 210 executes various functions, such as an image control function, a display control function, an audio control function, an external instruction recognition function, a communication control function, an optical signal reception function, a power control function, software operation platforms supporting various functions and a browser function. Differentially, the external instruction recognition module 2907 in the chip N and the external instruction recognition module 3907 in the chip A can recognize different instructions.

Exemplarily, since image receiving devices such as a camera are connected with the chip A, the external instruction recognition module 3907 in the chip A may include a graphic recognition module 3907-1, and a graphic database is stored in the graphic recognition module 3907-1. When the camera receives an external graphic instruction, the external graphic instruction corresponds to the instruction in the graphic database to perform instruction control on the display device. Since a voice receiving device and the remote controller are connected with the chip N, the external instruction recognition module 2907 in the chip N may include a voice recognition module 2907-2, and a voice database is stored in the speech recognition module 2907-2. When the voice receiving device and other devices receive an external voice instruction, the external voice instruction corresponds to the instruction in the voice database to allow instruction control on the display device. Similarly, a control apparatus 100 such as a remote controller is connected with the chip N, and a key instruction recognition module performs instruction interaction with the control apparatus 100.

In some embodiments, there is no difference between the first chip and the second chip, the controller in the display device is an operating system at a software level, and the built-in application may be the same as the application in a dual-chip architecture display device. All the interfaces described above are arranged as well.

Figure 6A:
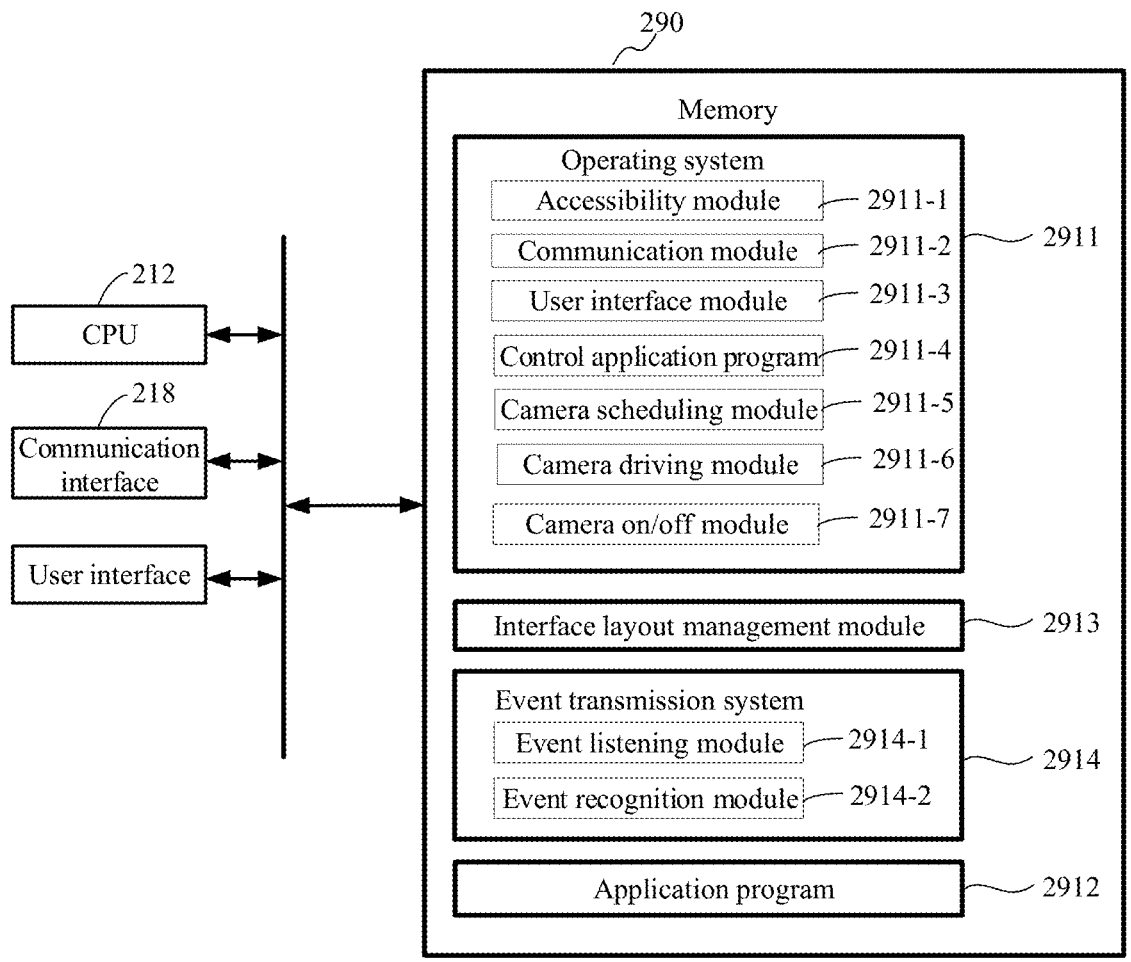
FIG. 6A schematically shows a schematic diagram of a software configuration of the display device 200.

FIG. 6A exemplarily shows a configuration block diagram of a software system in the display device 200 in some embodiments.

For the chip N, as shown in FIG. 6A, the operating system 2911 includes execution operating software for processing various base system services and implementing hardware-related tasks, and serves as a medium for completing data processing between the applications and hardware components.

In some embodiments, part of operating system kernels may include a series of software to manage hardware resources of the display device and provide services for other programs or software codes.

In other embodiments, part of the operating system kernels may include one or more device drivers, which may be a set of software codes in the operating system to help operate or control the device or hardware associated with the display device. The driver may contain codes to operate video, audio, and/or other multimedia components. For example, displays, cameras, Flash, WiFi and audio drivers are included.

As shown in FIG. 6A, in some embodiments, the operating system 2911 may specifically include an accessibility module 2911-1, a communication module 2911-2, a user interface module 2911-3, and a control application 2911-4.

In some embodiments, the operating system 2911 may further include a camera scheduling module 2911-5, a camera driving module 2911-6 and a camera on/off module 2911-7.

The accessibility module 2911-1 is used to modify or access the application to realize the accessibility of the application and the operability of the displayed content.

The communication module 2911-2 is used to be connected with other peripherals via relevant communication interfaces and communication networks.

The user interface module 2911-3 is used to provide an object displaying the user interface for each application to access, so as to realize user operability.

The control application 2911-4 is used for controlling process management and switching foreground applications, including runtime applications and the like.

The camera scheduling module 2911-5 is used to control the camera to be turned on or off, and to rise or fall.

The camera driving module 2911-6 is used for driving a motor mechanically connected with the camera under the control of the camera scheduling module 2911-5 to make the camera rise or fall.

The camera on/off module 2911-7 is used to turn on the camera to enable the camera to be in the turned-on state, or turn off the camera to enable the camera to be in the turned-off state, under the control of the camera scheduling module 2911-5.

As shown in FIG. 6A, in some embodiments, the event dispatch system 2914 can be implemented in the operating system 2911 or the application 2912. In some embodiments, on one hand, the event dispatch system 2914 can be implemented in the operating system 2911, and meanwhile, the event dispatch system 2914 is implemented in the application 2912, which is used to listen various user input events; and according to various events, it refers to recognition results of various events or sub-events in response to the various events, so as to implement a processing program of one or more groups of predefined operations.

Specifically, the event dispatch system 2914 may include an event monitor module 2914-1 and an event recognition module 2914-2, wherein the event monitor module 2914-1 is used to listen the events or the sub-events, input from the user input interface.

The event recognition module 2914-2 is used for defining various events which a user inputs into various user input interfaces, recognizing various events or sub-events, and dispatching the recognized events or sub-events to the processing program for performing one or more groups of the operations.

It should be noted that the events or the sub-events refer to inputs detected by one or more sensors in the display device 200 and inputs from external control devices (such as the control apparatus 100), such as various sub-events of voice input, sub-events of gesture input of gesture recognition, and sub-events of remote key instruction input of a control apparatus. Exemplarily, one or more sub-events in the remote controller include various forms, but not limited to one or a combination of pressing the up/down/left/right key, pressing the OK key, holding the key, and the like, and operations of non-physical keys, such as moving, holding and releasing.

The interface layout management module 2913 directly or indirectly receives each user input event or sub-event, monitored by the event dispatch system 2914, and is used to update the layout of the user interface, including but not limited to the position of each control or sub-control on the interface, and various operations related to the interface layout, such as size or position or hierarchy of the container.

Since the functions of the operating system 3911 in the chip A are similar to those of the operating system 2911 in the chip N, similar features can refer to the operating system 2911, and will not be described in detail here.

Figure 6B:
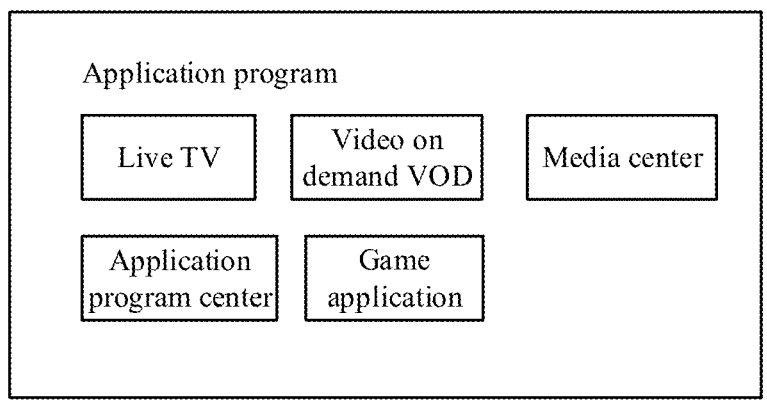
FIG. 6B schematically shows a schematic diagram of an application configuration in the display device 200.

As shown in FIG. 6B, an application layer of the display device includes various applications executable in the display device 200.

The application layer 2912 in the chip N may include, but is not limited to, one or more applications, such as a video-on-demand (VOD) application, an application center and a game application. The application layer 3912 in the chip A may include, but is not limited to, one or more applications, such as a live TV application and a media center application. It should be noted that which applications are included in the chip A and the chip N are determined according to the operating system and other designs, and the present disclosure does not intend to specifically define and divide the applications included on the chip A and the chip N.

The live TV application can provide live TV through different signal sources. For example, the live TV application can provide TV signals using inputs from cable TV, wireless broadcasting, satellite services, or other types of live TV services. The live TV application can display the videos of live TV signals in the display device 200.

The VOD application can provide the videos from different storage sources. Unlike the live TV application, the VOD provides video display from some storage sources. For example, the video provided by the VOD can come from a server side of cloud storage and from a local hard disk memory containing stored video programs.

The media center application can provide various multimedia content playing applications. For example, the media center may be different from the live TV or the VOD, and users can access various images or audio services through the media center application.

The application center can provide and store various applications. The applications may be a game, an application, or some other applications that are related to a computer system or other devices, but can run in the display device. The application center can obtain the applications from different sources, store the applications in the local storage, and then run the applications in the display device 200.

In some embodiments, independent operating systems can be installed in the chip A and the chip N, respectively, so that two independent but interrelated subsystems exist in the display device 200. For example, both the chip A and the chip N can be independently installed with Android and various APPs, so that each chip can achieve a certain function, and the chip A and the chip N can cooperate to achieve a certain function.

Figure 7:
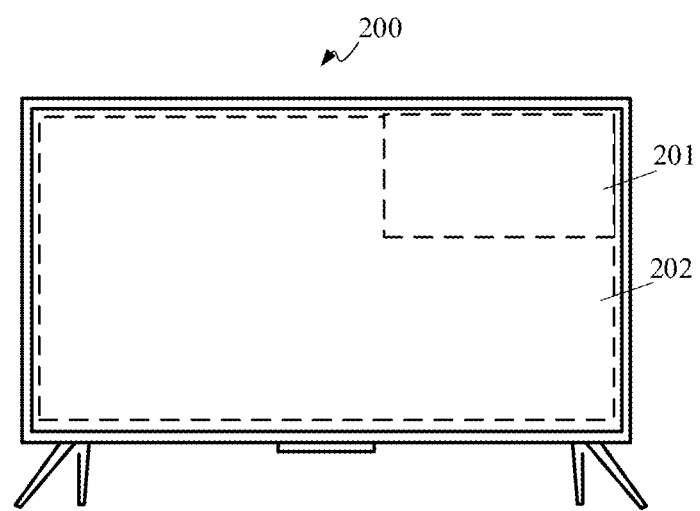
FIG. 7 schematically shows a schematic diagram of a user interface of the display device 200.

FIG. 7 exemplarily shows a schematic diagram of a user interface in the display device 200 according to an exemplary embodiment. As shown in FIG. 7, the user interface includes a plurality of view display areas, for example, a first view display area 201 and a play image 202, wherein the play image includes layout of one or more different items. The user interface also includes a selector for indicating item selection, and the position of the selector can be moved by user input to change and select different items.

It should be noted that a plurality of view display areas can present different levels of display images. For example, the first view display area can present video chat content, and the second view display area can present application layer content (e.g., web page video, VOD display and application image).

Alternatively, the presentation of different view display areas has different priorities, and the display priorities of view display areas are different among view display areas with different priorities. For example, the priority of a system level is higher than that of an application layer, and when the user uses a selector to switch the image in the application layer, the image display in the view display area at the system level is not blocked; and when the size and the position of the view display area of the application layer are changed according to the user selection, the size and the position of the view display area at the system level are not affected.

Images with same hierarchy can also be presented. In this situation, the selector can switch between the first view display area and the second view display area. When the size and the position of the first view display area are changed, the size and the position of the second view display area can be changed accordingly.

In some embodiments, any area in FIG. 7 can display the image captured by the camera.

"Item" refers to visual objects displayed in each view display area on the user interface in the display device 200 to represent corresponding content such as icons, thumbnails and video clips. For example, the item can represent the image content or video clips of a movies and TV series, the audio content of music, an application, or other user access content history information.

In some embodiments, the "item" can be displayed as thumbnail images. For example, when the item is the movies or the TV series, the item can be displayed as a poster of the movies or the TV series. If the item is music, the item can be shown as the poster of music album. If the item is the application, the item can be shown as the icon of the application, or a screenshot of the content of the application captured when the application is executed recently. If the item is a user access history, the item can be displayed as a screenshot of the content in the recent execution process. The "item" can be displayed as video clips, for example, the item is a video clip dynamic picture of a trailer of TV or the TV series.

In addition, the item can represent the interface or an interface set for connecting the display device 200 and the external device, or can represent the name of the external device connected to the display device, and the like, such as a set of signal source input interfaces, or an HDMI interface, a USB interface and a PC terminal interface. The items can have the same size or different sizes. In some embodiments, the size of the item can be changed.

"Selector" is used to indicate that any item has been selected, such as cursor or focus objects. According to a user's input via the control apparatus 100, the cursor movement in the display device 200 is controlled to select or control one or more items. According to a user's input via the control apparatus 100, the control item or items can be selected by moving the focus object displayed in the display device 200, and one or more items can be selected or controlled. For example, a user can select and control the item by controlling movement of the focus object between the items through direction keys on the control apparatus 100.

Figure 8A:
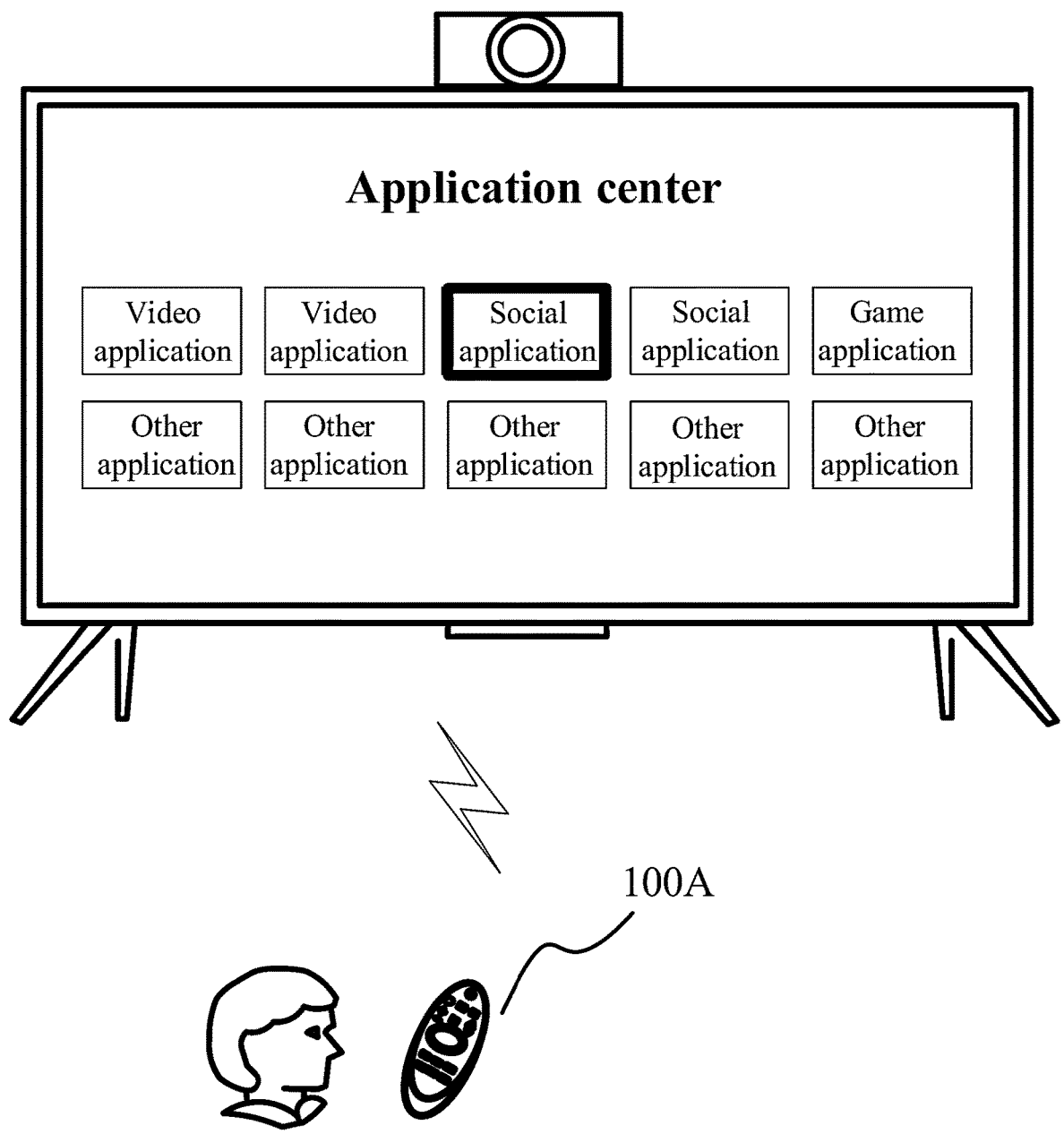
FIG. 8A shows a scene where a user interacts with the display device through a control apparatus 100A according to an exemplary embodiment.

FIG. 8A shows a scene where a user interacts with the display device via a control apparatus 100A according to an exemplary embodiment of the present disclosure. As shown in FIG. 8A, the display device presents an operation interface of the application center, and the application center includes a plurality of applications, one or more applications are social applications, such as XX application, WeChat and YY application. In the scene shown in FIG. 8A, the user selects to start one social application.

Figure 8B:
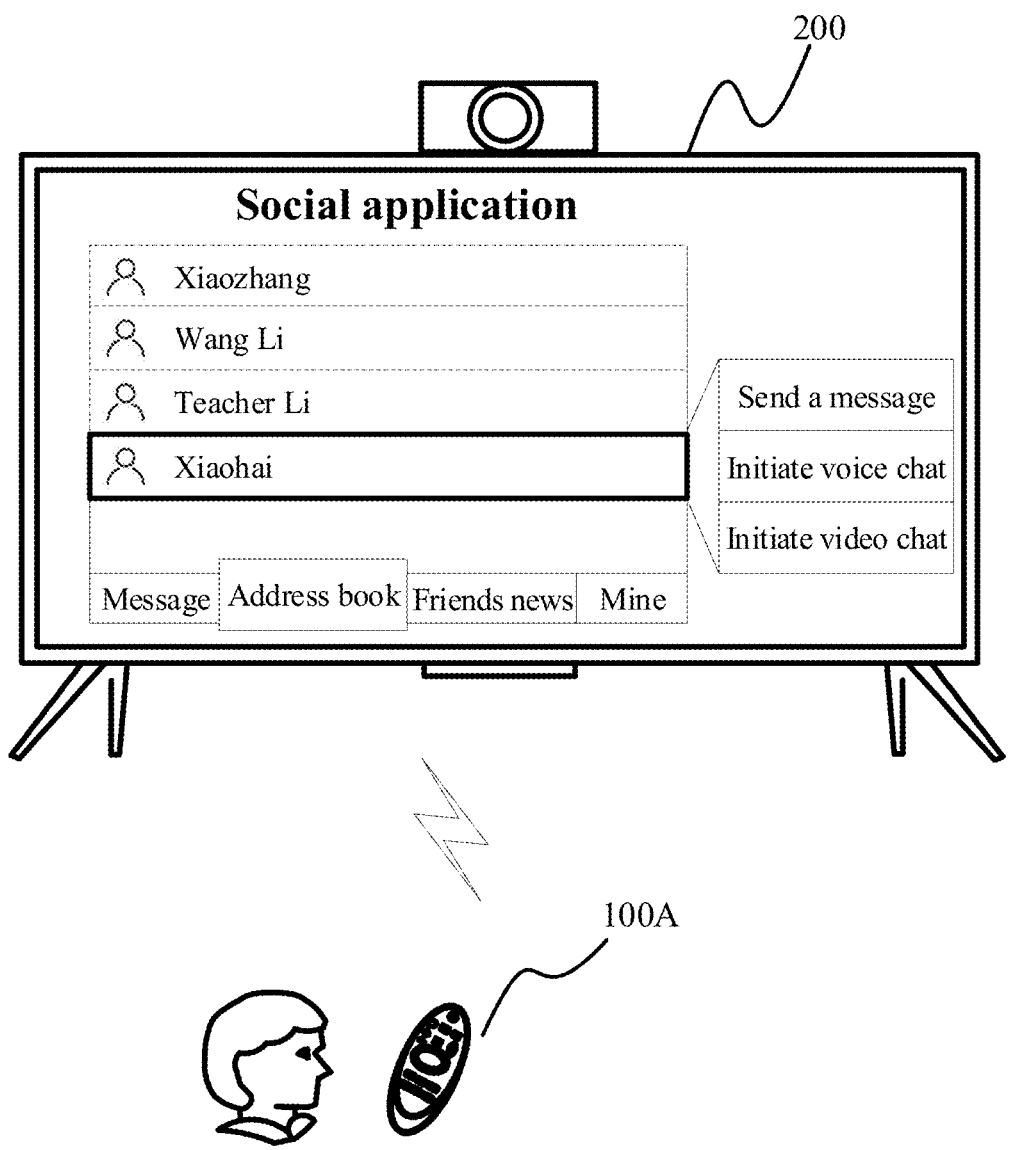
FIG. 8B shows another scene where the user interacts with the display device through the control apparatus 100A according to an exemplary embodiment.

FIG. 8B shows another scene where a user interacts with the display device via the control apparatus 100A according to an exemplary embodiment of the present disclosure. As shown in FIG. 8B, the display device presents an operation interface corresponding to the social application selected by the user in the scene shown in FIG. 8A, where the user can select one or more friend accounts in an address book and initiate video chat.

When the user selects a friend account and initiates video chat, the social application will generate a command for video communication with one or more friends, and the communication module of the display device sends a video communication request to one or more peer devices logging in to the corresponding account. Meanwhile, the image collector in the display device collects the image data of the scene where the local user is located in response to the command. In addition, the video processor in the display device can encode the collected image data and send the encoded image data to the one or more peer devices via the communication module. When a communication link between the local device and one or more peer devices is successfully connected, one or more peer devices can receive the video data stream sent from the local device. The one or more peer devices decode the video data stream to obtain the corresponding image, which will be presented on the display screen. Meanwhile, the local device can also receive and decode the video data stream sent from the one or more peer devices and present the decoded video data stream on the display screen.

Figure 9A:
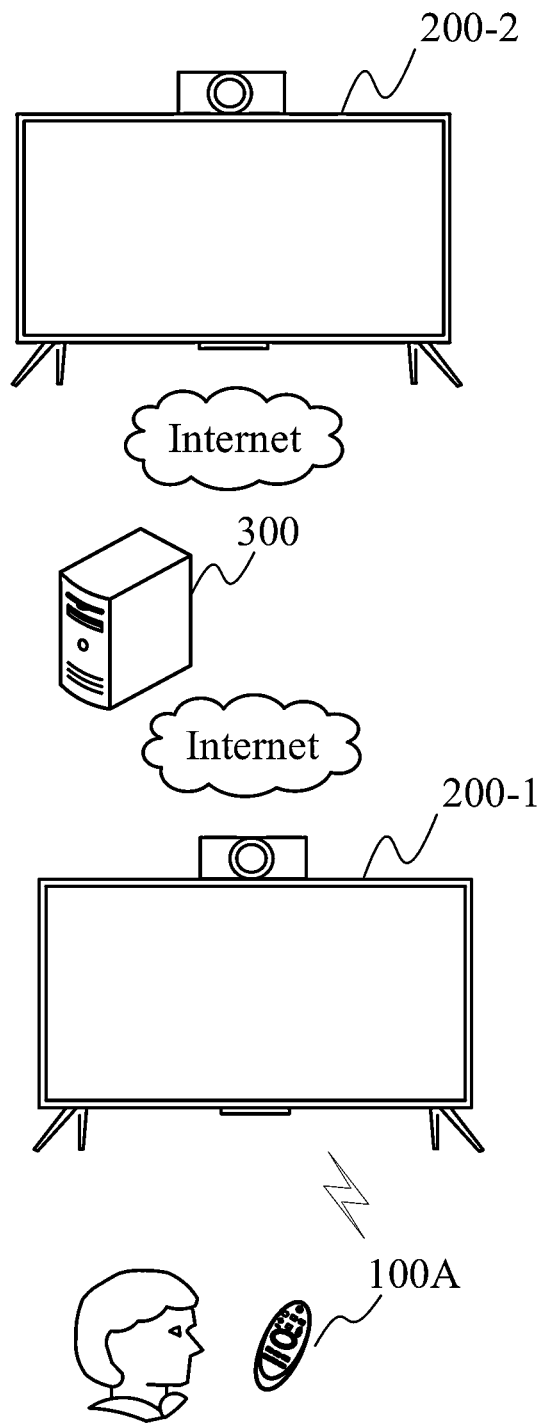
FIG. 9A is a schematic diagram of an application scene of the present disclosure.

FIG. 9A is a schematic diagram of an application scene according to the present disclosure. As shown in FIG. 9A, a local display device 200-1 and a peer display device 200-2 make a video call by establishing a communication connection. In the scene, a video window is presented on the screen of the local display device, and used to present a one-channel video image (i.e., the peer video image), and in addition, a preview window of the video image of the local device is also presented.

In some embodiments, the video window used to present the peer video image is referred to as the peer display window, and the preview window used to present the video image of the local device is referred to as the local preview window.

Figure 9B:
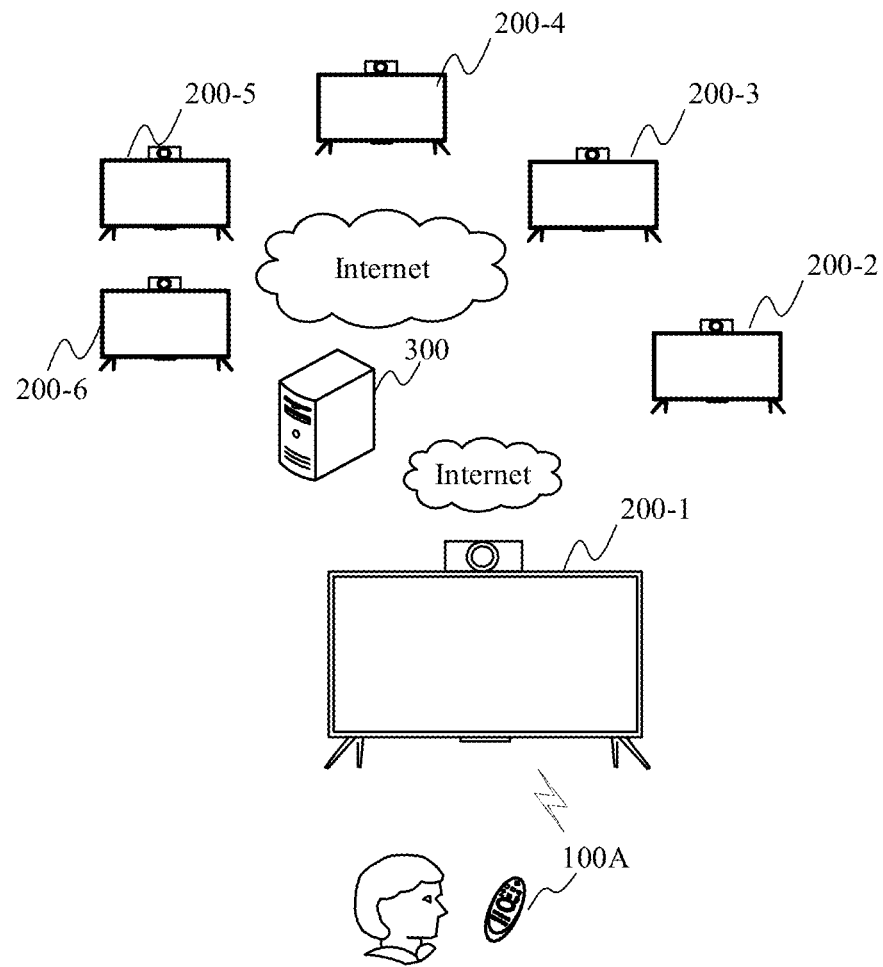
FIG. 9B is a schematic diagram of another application scene of the present disclosure.

FIG. 9B is a schematic diagram of another application scene according to the disclosure. As shown in FIG. 9B, the local display device 200-1 and 5 peer display devices 200-2, 200-3, 200-4, 200-5 and 200-6 make a video call by establishing a communication connection. In this scene, 5 video windows are presented on the screen of the local display device, and are used to present five-channel video images, and in addition, a preview window of the video image of the local device is also presented.

Based on the above application scenes, since the display device is in a relatively fixed position in the room, the comfortable viewing distance for users is far, when two or more persons have video chat with each other, in the global images collected by the peer device, the peer user, especially the face of the peer user, only occupies a small part of the whole image, which results in the peer user and his or her face presented by the local device to the local user being very small. The term global image here generally refers to a scene captured by an image capturing device internal or external to the peer devices or local devices. In addition, the far viewing distance between the local user and the display device causes the actually viewed peer user and his or her face to be smaller. In a scenario where multiple persons are in the chat, multiple video windows are presented on a local screen at the same time, which leads to the situation that the target in each video window is further zoomed out, and the video chat experience for the user is seriously affected. In addition, when the peer user moves to a farther position, the above problems will be worse.

Figure 10A:
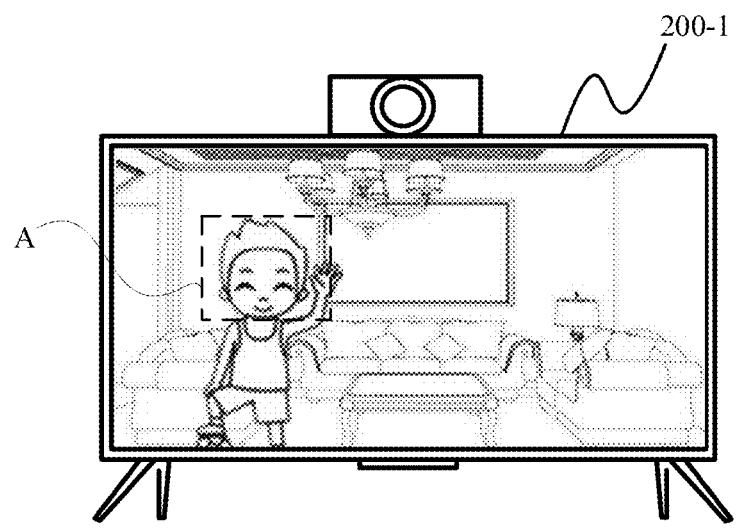
FIG. 10A shows a video interface presented by a local device when two persons have video chat with each other.

Exemplarily, FIG. 10A shows a video interface presented on the local device when two persons have video chat with each other, and the video interface includes a peer user and the scene where the peer user is located.

Figure 10B:
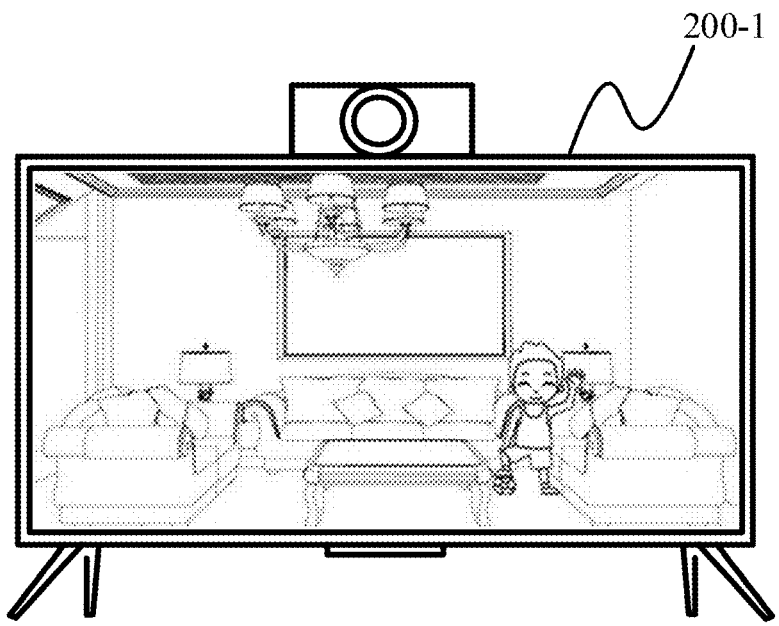
FIG. 10B shows another video interface presented by the local device when two persons have video chat with each other.

Exemplarily, FIG. 10B shows another video interface presented on the local device when two persons have video chat with each other, and the video interface includes a peer user and the scene where the peer user is located.

By comparing FIG. 10A with FIG. 10B, it can be seen that the area of the peer user, especially the face of the peer user, presented in FIG. 10B, is very smaller because the peer user moves to a position farther away from a peer image collector.

Figure 10C:
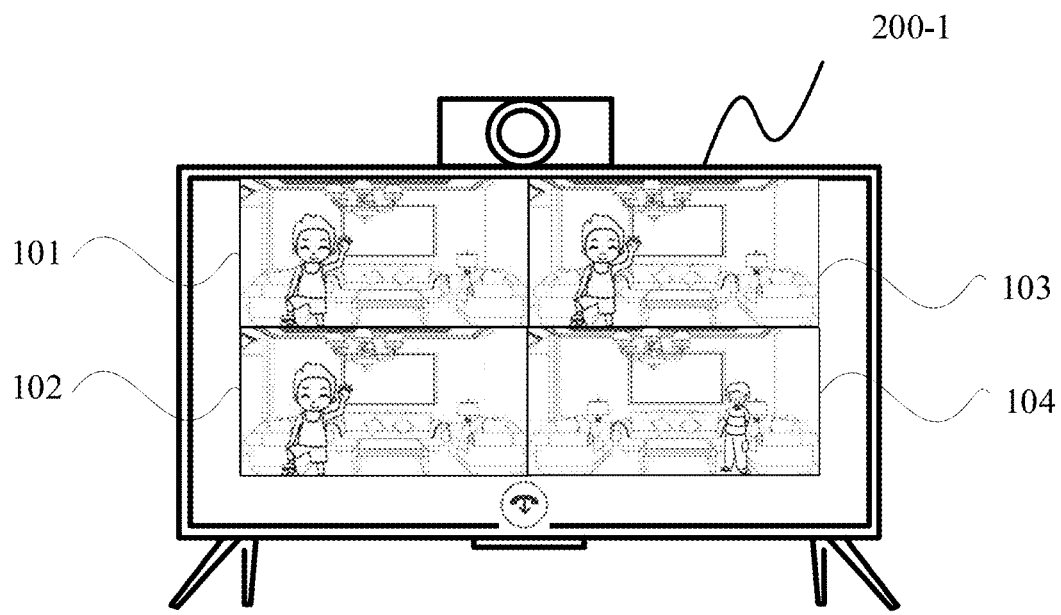
FIG. 10C shows a video interface presented by the local device when four persons have video chat with one another.

Exemplarily, FIG. 10C shows a video interface presented on the local device during four-person video chat. The video interface includes three windows 101, 102 and 103 respectively corresponding to three peer users, and a preview window 104 for previewing the image of the local device. It can be seen that compared with 10A, for 10C, multiple video windows are presented on a local screen at the same time, which leads to the situation that the target in each video window is further zoomed out, and the video chat experience for the user is seriously affected.

In order to solve the above problems, in some embodiments, the controller in the display device collects the global image of the local device through the image collector (such as a camera) in response to the command for video communication with at least one peer device. The local preview window is presented on the user interface, and the video image of the local device is displayed in the local preview window according to the global image. When there is a moving target in the global image, the video image of the local device is the partial image corresponding to the target stable area of the moving target. In response to the establishment of the video communication connection with the peer device, the video data of the local device is generated according to the video image of the local device, displayed in the local preview window and sent to the peer device.

At the peer device side, the controller in the peer device receives the video data sent from the display device in response to the establishment of the video communication connection with the display device; and the peer display window is presented on the user interface. According to the video data sent from the display device, the peer video image is displayed in the peer display window. When there is a moving target in the peer video image, the peer video image is the image corresponding to the target stable area of the moving target.

In this example, the display device processes the global image according to the target stable area containing the moving target to obtain a partial image, and uses the partial image in video communication with the peer device, so that the effect of tracking the moving target in real time and mainly presenting the target stable area can be achieved in the video communication process, even if the local user is far away from the image collector of the display device or the video window on the local screen is small, the moving target, that is, the face of the user, can be clearly presented, and further, the video communication experience for the user can be improved.

In some embodiments, when the user uses a "looking in the mirror" function, the user starts the image collector by operating the control apparatus, and the image collector is started to collect the global image for the local device. In response to starting of the image collector, the controller of the display device obtains the global image for the local device, collected by the image collector, presents a local preview window on the user interface, and displays the video image of the local device in the local preview window according to the global image of the local device. When a moving target exists in the global image, the video image of the local device is the partial image corresponding to the target stable area of the moving target.

In the scene where the user uses the "looking in the mirror" function, the display device processes the global image according to the target stable area containing the moving target to obtain the partial image, and presents the partial image in the local preview window. In this way, when the user uses the "looking in the mirror" function, the effect of tracking the moving target in real time and mainly presenting the target stable area can be achieved, so that the moving target, that is, the face of the user, can be clearly presented even if the local user is far away from the image collector of the display device or the video window on the local screen is small, thereby improving the "looking in the mirror" experience for the user.

It should be noted that, compared with the above implementation of video communication, in the above implementation of "looking in the mirror" function, the partial image obtained by the display device according to the global image is only used for local display, and does not need to be sent to a peer device. In any implementation, the specific implementation process of the partial image obtained by the display device according to the global image can refer to the following method embodiments.

Figure 11:
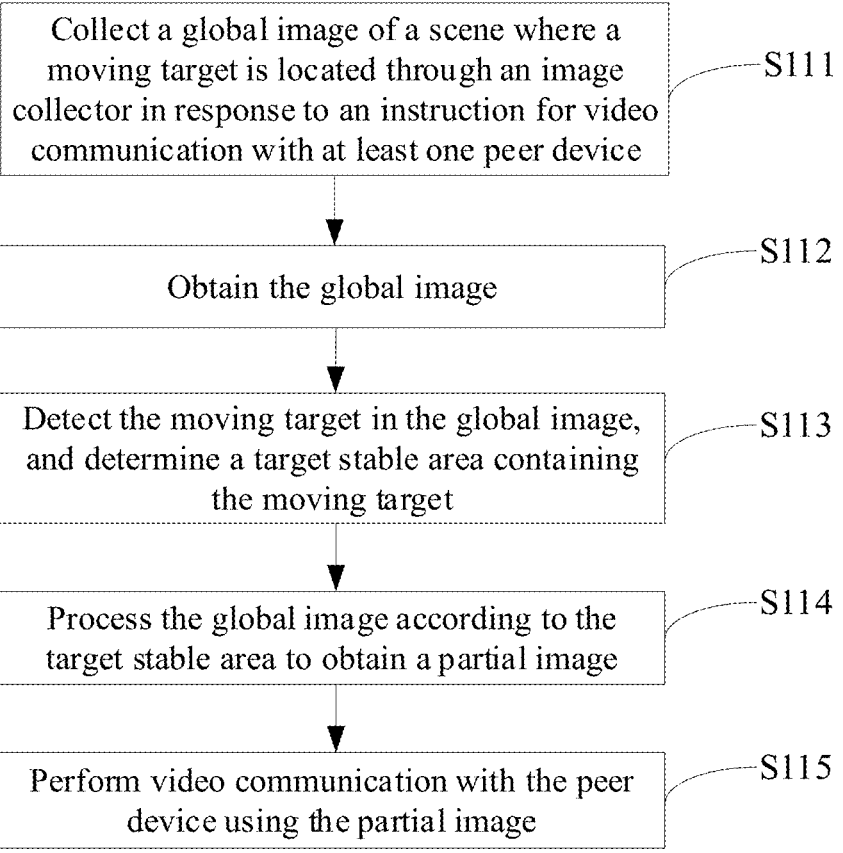
FIG. 11 shows a flowchart of an embodiment of a video communication data processing method based on the display device in the present disclosure.

The specific implementation process of the above example, especially the process that the display device obtains the partial image according to the global image, will be described in detail below in combination with the video communication data processing method according to the disclosure. FIG. 11 is a flowchart of an embodiment of a video communication data processing method in the present disclosure, which is applied to a display device, or the executing body of the method is a controller of the display device, such as the first controller or the second controller shown in FIG. 4, but is not limited thereto. As shown in FIG. 11, the method may include the following steps.

Step 111: collecting, by the display device, a global image of a scene where a moving target is located through an image collector in response to a command for video communication with at least one peer device.

In a scenario, the local user operates on an application which support video communication, and selects one or more friends from the address book to initiate video communication. In response to the operation from the user, the application can generate a command which instructs the local device to send a video communication request to the peer device corresponding to the friend account selected by the local user, so as to perform video communication with the peer device.

In another scenario, first, the peer user operates on an application which supports video communication, and selects one or more friends at least including the local user from the address book to initiate video communication. In response to the operation from the user, the peer application can generate an instruction indicating the peer device to send a video communication request to one or more peer devices at least including the local display device, and the local user operates on the local application to receive the request. The local application generates another instruction in response to the operation from the user, and the instruction indicates the local display device to receive the video request sent from the peer device to perform video communication with the peer device.

In the embodiments, the local display device has an image collector, such as the camera as shown in FIG. 1. In addition, the peer device also has an image collection function, for example, if the peer device is a portable terminal device such as a mobile phone, images are collected through a built-in camera of such a terminal, and if the peer device is a household display device such as a smart TV, the household display device is the image collector 341 at least as shown in FIG. 4.

Because the purpose of video communication is to provide real-time video images of two parties involved and the scenes for the users involved in the video, if one end user cannot see another end user clearly in the video image due to the above problems, the experience for the user in video communication is affected, and even the meaning of video communication is lost.

Due to the characteristic of user movements in the video communication image, the moving target discussed is a user participating in video communication can mover at any time. For the local device, the user is a local user. In a more specific implementation schemes, the moving target can be the face or the head of the user participating in video communication.

The scene where the moving target is located is the scene corresponding to the collection range of the image collector, and the global image is the video image collected by the image collector of the scene where the moving target is located.

Exemplarily, FIG. 10A shows the global image collected by the image collector at a first time, and FIG. 10B shows the global image collected by the image collector at a second time. If the face of the user is set as the moving target in advance, by comparison, it can be seen that the position of the moving target is moved in the scene, so that the size of the moving target shown in FIG. 10A is larger and the size of the moving target shown in FIG. 10B is smaller.

Step 112: obtaining a global image.

Referring to FIG. 4, in an implementation, in the display device, the image collector is connected with the first chip, the first chip obtains global image data collected by the image collector, and the first chip or the video processor connected with the first chip executes the step according to the method of the present disclosure, that is to say, the executing body of the steps as shown in the embodiment of the method can be the first chip or the video processor connected with the first chip.

In another implementation, since a plurality of communication interfaces or serial ports exist between the first chip and the second chip, after the first chip obtains the global image data collected by the image collector, the first chip partially processes the data or does not process the data, then the data is sent to the second chip, and the second chip or a video processor connected with the second chip executes the steps according to the method in the present disclosure, that is, the executing body of the steps as shown in the embodiment of the method in the present disclosure can be the second chip or the video processor connected with the second chip.

Certainly, in additional implementation, the image collector may be connected with the second chip, the second chip obtains the global image data collected by the image collector, and the second chip or a video processor connected with the second chip executes the steps according to the embodiments of the method in the present disclosure. Similarly, the data can also be sent to the first chip for processing, which will not be described in detail herein.

In specific implementation, there are two ways to obtain camera data based on an Android system, one way is to set preview SurfaceTexture for the camera, and camera texture is obtained through callback; and the other way is to obtain buffer data of a specified format through PreviewCallback of the camera. The camera data is usually rendered to the screen through GLSurfaceView or SurfaceView. Based on the above description, in a specific embodiment of the present disclosure, the PreviewCallback and the SurfaceTexture are used to obtain the camera data, and GLSurfaceView rendering is used for browsing. In another specific implementation, SurfaceTexture is used to obtain the camera data, and GLSurfaceView rendering is used for browsing.

Step 113, detecting a moving target in the global image, and determine the target stable area containing the moving target.

In specific applications, if the face of a person is set as the moving target in advance, detecting the moving target in the global image is to detect the face area in the global image. In specific implementation, the face area in the global image can be detected by calling a neural network model in deep learning, such as a convolutional neural network model. Detecting the target area in the image by using the trained neural network model is a known technology and is well known to those skilled in the art, so it will not be described in detail in the embodiments of the disclosure.

It should be noted that there may be one moving target, namely the face of one person in a frame of the global image, or multiple moving targets, namely faces of multiple persons in the a frame of the global image, or no moving target in a frame of the global image, which can be interpreted as that the user is not in the collection range of the image collector.

The target stable area refers to a stable area where the moving target is located in the global image, or in consecutive N frames of the global image, the moving target appears in the target stable area with a high probability, wherein the N frames of the global image correspond to one target stable area, and N is a preset number.

Specifically, in step 113, first, the moving target in each frame of the global image is detected to determine a target position, wherein the target position is the center point of the area where the moving target is located in the global image. For example, in the global image shown in FIG. 10A, the area where the target position is located is an area A, and the target position is the center point of the area A, wherein a quantitative parameter used to represent the target position is coordinates of the center point position in the area where the moving target is located, such as (x, y).

Figure 10D:
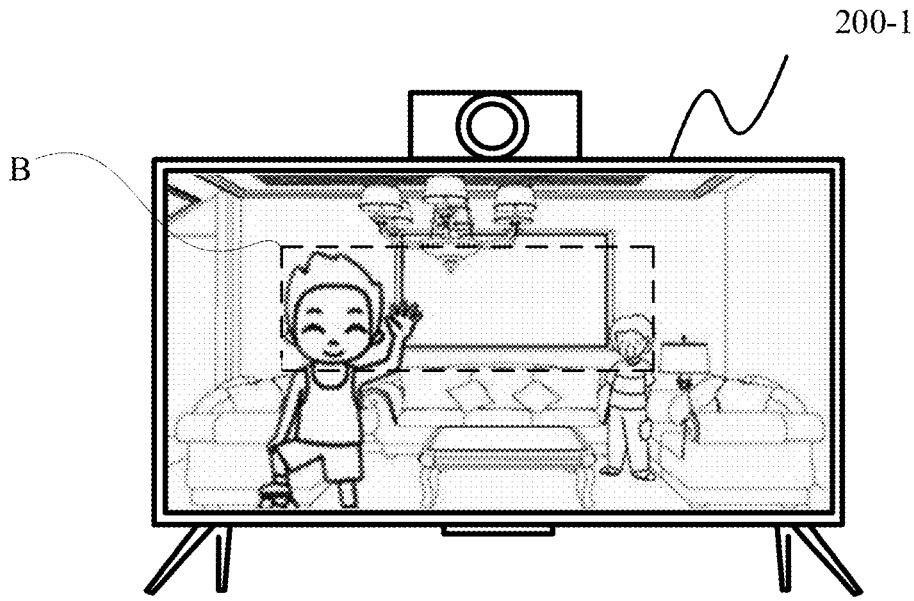
FIG. 10D shows another video interface presented by the local device when two persons have video chat with each other.

It should be noted that since there may be one or more moving targets in the global image, the area where the moving targets are located needs to be the area where all moving targets are located in the global image. When multiple moving targets exist, each moving target needs to be traversed, and the area where the corresponding moving target is located is determined according to the moving targets with the highest position, the lowest position, the leftmost position and the rightmost position, so as to ensure that each moving target is in the determined area. For example, FIG. 10D shows a global image presented on the local device during video chat between two persons. The global image includes face areas of the two persons, and the two face areas are two moving targets. The area where corresponding moving targets are located is the area B as shown in the figure, and the target position is the center point of the area B.

In specific implementation, a two-dimensional coordinate system of the global image is established in advance according to the camera texture of the display device, and any position or position relationship as shown in the present disclosure is discussed with the two-dimensional coordinate system as a reference. In addition, because the area where the moving target is located corresponds to one or more parts of the global image, and is a set of countless points, the center point position of the area where the moving target is located is taken as the target position. In addition, because the actual size of the global image, the area where the moving target is located, and the target stable area can change under different scaling proportions, the values of the coordinates of the center point as shown in the present disclosure are relative values rather than absolute values suitable for the scaling proportions.

After the moving target in each frame of the global image is detected and the target position is determined, the occurrence frequency of each position in N target positions, corresponding to consecutive N frames of the global image, is counted, and the area corresponding to the position with the largest occurrence frequency is taken as the target stable area for the N frames of the global image.

Specifically, the N target positions corresponding to the N frames of the global image are traversed, and when the i-th target position is traversed, the i-th target position is matched with the first to (i−1)-th target positions respectively, and i∈(1, N]; if the i-th target location is matched with at least one of the first to (i−1)-th target positions, the current occurrence frequency of the matched two target positions will be increased by 1.

For example, if the i-th target position is matched with the first target position, the current occurrence frequency of the i-th target position and the first target position will be increased by 1. If the i-th target position is matched with both the first target position and the (i−5)-th target position, the current occurrence frequency of the i-th target position will be increased by 2, and the current occurrence frequency of the first and (i−5)-th target positions will be increased by 1 respectively.

It should be noted that the initial frequency of each target position is 1. Alternatively, the current frequency of the i-th target position is 1 before matching the i-th target position with the first to (i−1)-th target positions respectively.

Exemplarily, when the i-th target location is traversed, the current frequency of the first to i-th target positions can be as shown in Table 1 below.

TABLE 1

| Serial number of target positions | Current frequency |
|---|---|
| 1 | 1 |
| 2 | 3 |
| . . . | . . . |
| i − 1 | 2 |
| 1 | 3 |
| i + 1 | 1 (initial frequency) |
| . . . | . . . |

As a matching approach, matching the i-th target position with the first to (i−1)-th target positions, respectively, may include the following steps.

First, calculating a reference distance corresponding to the i-th target position according to the i-th target position and a preset reference point.

Wherein the preset reference point may be any one of four corner points of the global image. In order to facilitate calculation, one corner point of the global image is taken as a coordinate origin, and then the coordinate origin may be preset as the reference point. In the specific calculation, coordinate of the target position (the coordinates of the center point of the area where the moving target is located) and the coordinate of the preset reference point are substituted into the calculation formula of the distance between two points, and the reference distance corresponding to the target position is calculated.

Second, calculating the difference value between the reference distance corresponding to the i-th target position and the reference distances corresponding to the first to (i−1)-th target positions respectively, wherein the reference distances corresponding to the first to (i−1)-th target positions are calculated and saved data. In the step, (i−1) difference values respectively corresponding to the first to (i−1)-th target positions can be obtained.

Finally, whether the two corresponding target positions are matched or not can be determined by determining whether each difference value belongs to the preset range. Specifically, if a certain difference value belongs to the preset range, it is determined that the two corresponding target positions are matched with each other, or else, the two corresponding target positions are not matched with each other. In a specific application, the preset range can be set to (−20 px, 20 px), that is, if the absolute difference value between the reference distance corresponding to the $i_{th}$ target position and the reference distance corresponding to the other target position is within 20 pixels, it is determined that the two target positions are matched with each other, which means that the two target positions are close.

As another implementation, matching the i-th target position with the first to (i−1)-th target positions, respectively, may include the following steps.

First, calculating a real distance between the i-th target position and the first to (i−1)-th target positions respectively.

In the specific calculation, the coordinates of the two target positions (the coordinates of the center point of the area where the moving target is located) are substituted into the calculation formula of the distance between two points, and the real distance between the two target positions is calculated. In the step, (i−1) real distance respectively corresponding to the first to (i−1)-th target positions can be obtained.

Then, whether the corresponding two target positions are matched or not is determined by determining whether each real distance belongs to a preset range. Specifically, if a certain real distance belongs to the preset range, it is determined that the two corresponding target positions are matched with each other, or else, the two corresponding target positions are not matched with each other.

In step 113, the target position is determined by detecting the moving target in each frame of the global image; by taking consecutive N frames of the global image as a group of statistical objects, the occurrence frequency of each of the N target positions corresponding to the consecutive N frames of the global image is counted, and the area corresponding to the position with the highest occurrence frequency is the target stable area of the N frames of the global image. It can be seen that because the area corresponding to the target position with the largest occurrence frequency is the target stable area of the N frames of the global image, the target stable area determined by the approach in step 113 is a stable area where the moving target is located for the N frames of the global image, or for the N frames of the global image, there is a high possibility that the moving target appears in the target stable area.

It is to be noted that, in order to guarantee picture quality and presenting effect of the partial image, the resolution proportion of the target stable area determined by an embodiment of the present disclosure is preferably consistent with the resolution proportion of the global image.

Step 114, processing the global image according to the target stable area to obtain the partial image.

In the step 114, the N frames of the global image corresponding to the target stable area are taken as a processing target group, and the N frames of the global image in the group are processed in batch. Specifically, first, the partial image corresponding to the target stable area is obtained from each frame of the global image; and then the partial image is enlarged according to a preset rule.

In a specific implementation for obtaining the partial image corresponding to the target stable area, a clipping box is preset according to an edge(s) of the target stable area, and the image area outside the clipping box is clipped according to the clipping box to obtain the partial image corresponding to the target stable area. It should be noted that for two adjacent processing target groups, i.e., two adjacent groups of consecutive N frames of the global image, such as the first to N-th frames and the (N+1)-th to 2N-th frames, if the target stable area corresponding to the later processing target group changes compared with the target stable area corresponding to the former processing target group, the clipping box can be moved from the target stable area before the change to the target stable area after the change in equal steps, so as to clip out the image area outside the clipping box.

In a specific implementation for enlarging the partial image according to the preset rule, a preset enlargement rule is as follows.

If the width $W_{partial}$ of the partial image is less than one quarter (namely ¼ $W_{global}$) of that of the global image, or the height $H_{partial}$ of the partial image is less than one quarter (namely ¼ $H_{global}$) of that of the global image, the partial image is enlarged to half the size of the global image, that is, let $W_{partial}=½ W_{global}$, and $H_{partial}=½ H_{global}$.

If the width $W_{partial}$ of the partial image is greater than one quarter (namely ¼ $W_{global}$) of that of the global image and less than one half (namely ½ $W_{global}$) of that of the global image, or the height $H_{partial}$ of the partial image is greater than one quarter (namely ¼ $H_{global}$) of that of the global image and smaller than one half (namely ½ $H_{global}$) of that of the global image, the partial image can be enlarged to twice the original image, that is, let $W_{partial}=2W_{partial}$, and $H_{partial}=2 H_{partial}$.

If the width $W_{partial}$ of the partial image is greater than one half (namely ½ $W_{global}$) of that of the global image, or the height $H_{partial}$ of the partial image is greater than one half (namely ½ $H_{global}$) of that of the global image, the partial image can be enlarged to the size of the global image, that is, let $W_{partial}=W_{global}$, and $H_{partial}=H_{global}$.

In addition, the present disclosure further provides another alternative preset enlargement rule, which is different from the above enlargement rule.

If the width $W_{partial}$ of the partial image is greater than one quarter (namely ¼ $W_{global}$) and less than one half (namely ½ $W_{global}$) of that of the global image, or the height $H_{partial}$ of the partial image is greater than one quarter (namely ¼ $H_{global}$) and less than one half (namely ½ $H_{global}$) of that of the global image, the partial image can be enlarged to 1.5 times of size of the original image, that is, let $W_{partial}=1.5 W_{partial}$, and $H_{partial}=1.5 H_{partial}$.

Step 115, performing video communication with the peer device using the partial image.

During specific implementation, the partial image data is encoded to generate video data stream, and the video data stream is sent to the peer device.

In another embodiment, the method in the present disclosure may further include: step 106, presenting the partial image in the preview window of the display device, such as the preview window 104 as shown in FIG. 10C.

It should be noted that no matter in scenes where the partial image is previewed in the local device or a scene where the video data stream corresponding to the partial image is presented after being decoded at the peer end, if the size of the partial image is greater than that of a screen or that of a window, the local device or the peer device performs corresponding adaptive processing on the partial image.

According to the above embodiments, the embodiments of the disclosure provide the video communication data processing method. The method includes: collecting the global image of the scene where the moving target is located through the image collector in response to the instruction for video communication with one or more peer devices to obtain the collected global image; then detecting the moving target in the global image, and determining the target stable area containing the moving target; processing the global image according to the target stable area to obtain the partial image; and finally, performing video communication with the peer device by using the partial image.

The method disclosed in the present disclosure processes the global image according to the target stable area containing the moving target to obtain a partial image, and uses the partial image to perform video communication with the peer device, so that the effect of tracking the moving target in real time and mainly presenting the target stable area can be achieved in the video communication process, even if the local user is far away from the image collector of the display device or the video window on the local screen is small, the moving target, that is, the face of the user, can be clearly presented, and further, the video communication experience for the user can be improved.

Figure 12:
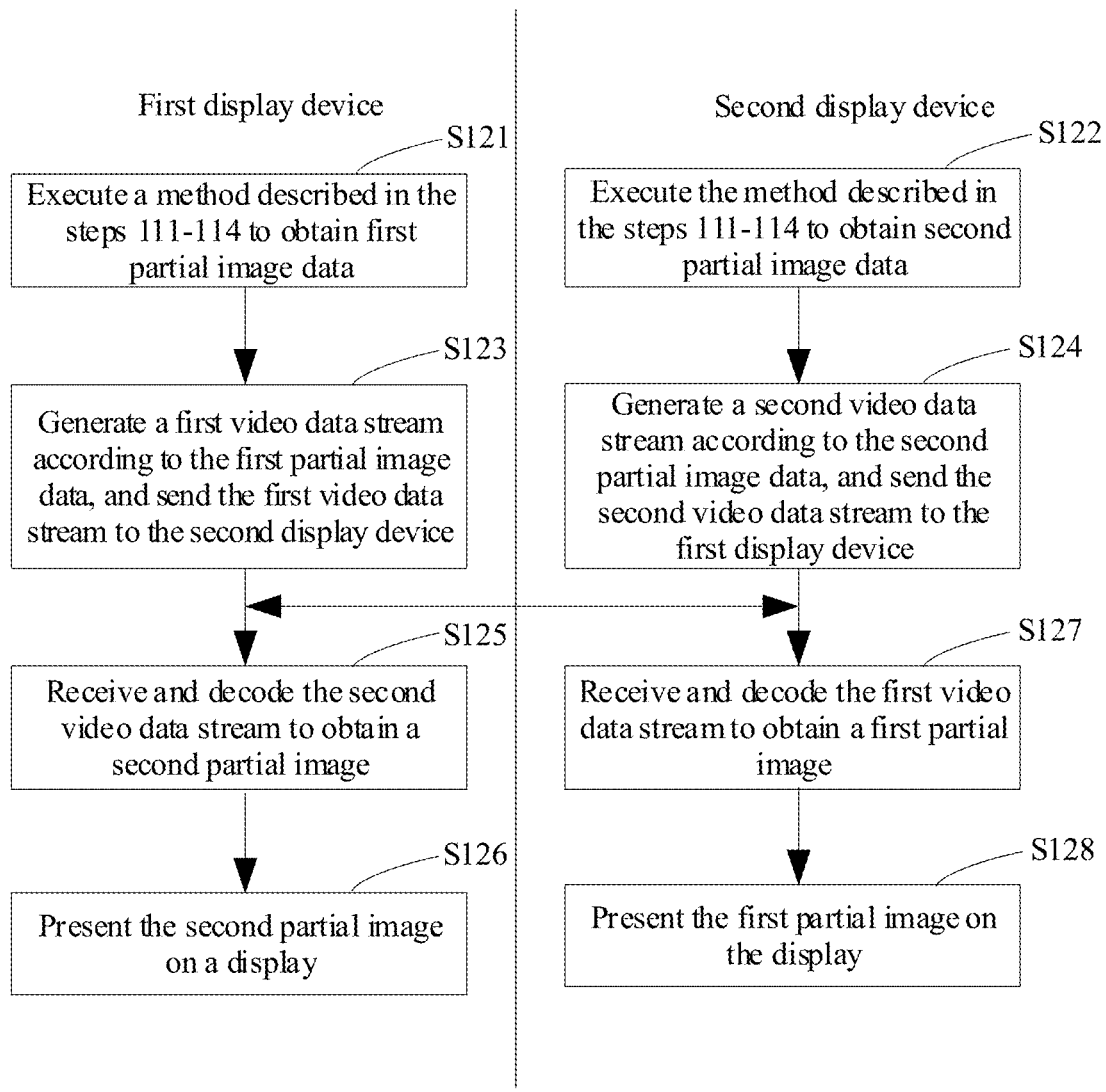
FIG. 12 is a schematic diagram of interaction between display devices in video communication according to an exemplary embodiment of the present disclosure.

According to the embodiments of the video communication data processing method in the disclosure, the disclosure further provides a video communication method. FIG. 12 is a schematic diagram of interaction between display devices participating in video communication according to an exemplary embodiment of the disclosure. As shown in FIG. 12, the method may include the following steps.

In step 121, performing, by a first display device, the method described in the steps 111-114 to obtain a first partial image data.

Besides, in step 122, performing, by a second display device, the method described in the steps 111-114 to obtain a second partial image data.

In step 123, generating, by a first display device, a first video data stream according to the first partial image data, and sending, by a first display device, the first video data stream to a second display device.

Besides, in step 124, generating, by the second display device, a second video data stream according to a second partial image data, and sending, by the second display device, the second video data stream to the first display device.

In step 125, receiving and decoding, by the first display device, the second video data stream to obtain a second partial image.

In step 126, presenting, by the first display device, the second partial image on the display.

Meanwhile, in step 127, receiving and decoding, by the second display device, the first video data stream to obtain a first partial image.

In step 128, presenting, by the second display device, the first partial image on the display.

The method disclosed in the disclosure processes the global image according to the target stable area containing the moving target to obtain the partial image, and uses the partial image to perform video communication with the peer device, so that the effect of tracking the moving target in real time and mainly presenting the target stable area can be achieved in the video communication process, even if the local user is far away from the image collector of the display device or the video window on the local screen is small, the moving target, that is, the face of the user, can be clearly presented, and further, the video communication experience for the user can be improved.

Based on the exemplary embodiments shown in the disclosure, all other embodiments obtained by those of ordinary skilled in the art without creative work are intended to be within the scope of protection of the disclosure. Furthermore, although the content disclosed in the disclosure is discussed according to one or more illustrative examples, it should be understood that a complete technical solution can be independently derived by all aspects of the disclosed content.

In specific implementations, the disclosure further provides a computer storage medium, wherein programs can be stored in the computer storage medium, and when being executed, the programs can include part or all of the steps in the embodiments of the method provided in the disclosure. The storage medium may be a magnetic disk, an optical disk, read-only memory (ROM), random access memory (RAM), or the like.

What is claimed is:

1. A display device, comprising:
   a display, configured to present a user interface;
   an image acquisition device, configured to collect a global image associated with the display device; and
   a controller, configured to:
   collect the global image associated with the display device through the image acquisition device in response to an instruction for video communication with at least one first device;
   update the user interface to display a video image from the display device in a first display window according to the global image; wherein the global image contains one or more moving targets, and the video image comprises a partial image corresponding to a target stable area of the one or more moving targets in the global image; and
   generate local video data according to the video image displayed in the first display window and send the local video data to the at least one first device, in response to establishment of a video communication connection with the at least one first device;
   wherein the controller is further configured to:
   detect the one or more moving targets in the global image, and determine the target stable area containing the one or more moving targets;
   process the global image according to the target stable area to obtain the partial image corresponding to the target stable area; and
   display the partial image as the video image in the first display window.

2. The display device according to claim 1, wherein the controller is further configured to:
   receive video data, from the at least one first device, in response to the establishment of the video communication connection with the at least one first device; and
   update the user interface to further display in a second display window for presenting the video data from the at least one first device.

3. The display device according to claim 1, wherein the global image comprises video frames and the controller is further configured to:
   detect the one or more moving targets in each video frame to determine a target position, wherein the target position corresponds to a center point position of an area where each of the one or more moving targets are located in the global image;
   count occurrence frequency of each of multiple target positions corresponding to consecutive N video frames of the global image, and determine an area corresponding to a target position with a largest occurrence frequency as the target stable area for the N video frames of the global image, wherein N is an integer greater than 1.

4. The display device according to claim 3, wherein the controller is further configured to:
   traverse N target positions corresponding to the N video frames of the global image, and match an i-th target position with first to (i−1)-th target positions respectively when traversing the i-th target position, wherein i∈(1, N]; and
   increase the current occurrence frequency of the matched two target positions by 1 under a condition that the i-th target position is matched with at least one of the first target position to the (i−1)-th target position.

5. The display device according to claim 4, wherein the controller is further configured to:
   calculate a reference distance corresponding to the i-th target position according to the i-th target position and a preset reference point;
   calculate difference values between the reference distance corresponding to the i-th target position and reference distances corresponding to the first target position to the (i−1)-th target position respectively; and
   determine whether two corresponding target positions are matched by determining whether each of the difference values belongs to a preset range.

6. The display device according to claim 3, wherein the controller is further configured to:
   obtain the partial image corresponding to the target stable area from the global image; and
   enlarge the partial image according to a preset rule.

7. The display device according to claim 6, wherein the controller is further configured to:
   configure a resolution of the partial image to be consistent with a resolution of the global image.

8. The display device according to claim 1, wherein the controller is further configured to:
   traverse each of one or more moving targets in the global image, and determine an area where the one or more moving targets are located according to the moving targets with a highest position, a lowest position, a leftmost position and a rightmost position, so as to ensure that the one or more moving targets are in the target stable area.

9. A video communication data processing method, comprising:
   collecting, by a controller of a display device, a global image associated with the display device through an image acquisition device in response to an instruction for video communication with at least one first device;
   updating, by the controller, a user interface to display a first display window, and displaying, by the controller, a video image from the display device in the first display window according to the global image; wherein the global image contains one or more moving targets, and the video image comprises a partial image corresponding to a target stable area of the one or more moving targets, in the global image; and generating, by the controller, local video data according to the video image displayed in the first display window and sending, by the controller, the local video data to the at least one first device, in response to establishment of a video communication connection with the at least one first device;

detecting, by the controller, the one or more moving targets in the global image, and determining, by the controller, the target stable area containing the one or more moving targets;

processing, by the controller, the global image according to the target stable area to obtain the partial image corresponding to the target stable area; and displaying, by the controller, the partial image as the video image in the first display window.

10. The method according to claim 9, further comprising:
receiving, by the controller, video data, from the at least one first device, in response to the establishment of the video communication connection with the at least one first device; and updating, by the controller, the user interface to further display a second display window for presenting the video data from the at least one first device.

11. The method according to claim 9, the global image comprises video frames and the method further comprising:
detecting, by the controller, the one or more moving targets in each video frame to determine a target position, wherein each of the target position corresponds to a center point position of an area where the one or more moving targets are located in the global image;

counting, by the controller, occurrence frequency of each of multiple target positions corresponding to consecutive N video frames of the global image, and determining, by the controller, an area corresponding to a target position with a largest occurrence frequency as the target stable area for the N video frames of the global image, wherein N is an integer greater than 1.

12. The method according to claim 11, further comprising:

traversing, by the controller, N target positions corresponding to the N video frames of the global image, and matching, by the controller, an i-th target position with first to (i−1)-th target positions respectively when traversing the i-th target position, wherein i∈(1, N]; and increasing, by the controller, the current occurrence frequency of the matched two target positions by 1 under a condition that the i-th target position is matched with at least one of the first target position to the (i−1)-th target position.

13. The method according to claim 12, further comprising:
calculating, by the controller, a reference distance corresponding to the i-th target position according to the i-th target position and a preset reference point;

calculating, by the controller, difference values between the reference distance corresponding to the i-th target position and reference distances corresponding to the first target position to the (i−1)-th target positions respectively; and determining, by the controller, whether two corresponding target positions are matched by determining whether each of the difference values belongs to a preset range.

14. The method according to claim 11, further comprising:
obtaining, by the controller, the partial image corresponding to the target stable area from the global image; and enlarging, by the controller, the partial image according to a preset rule.

15. The method according to claim 14, further comprising:
configure a resolution of the partial image to be consistent with a resolution of the global image.

16. The method according to claim 9, further comprising:
traversing, by the controller, each of one or more moving targets in the global image, and determining, by the controller, an area where the one or more moving targets are located according to the moving targets with a highest position, a lowest position, a leftmost position and a rightmost position, so as to ensure that the one or more moving targets are in the determined target stable area.

* * * * *